(12) United States Patent
Hagag et al.

(10) Patent No.: US 10,455,497 B2
(45) Date of Patent: Oct. 22, 2019

(54) SELECTIVE ACTIVATION OF COMMUNICATIONS SERVICES ON POWER-UP OF A REMOTE UNIT(S) IN A WIRELESS COMMUNICATION SYSTEM (WCS) BASED ON POWER CONSUMPTION

(71) Applicant: Corning Optical Communications LLC, Charlotte, NC (US)

(72) Inventors: Ron Hagag, Arlington, VA (US); Dror Harel, Hod Hasharon (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/225,992

(22) Filed: Dec. 19, 2018

(65) Prior Publication Data

US 2019/0124591 A1    Apr. 25, 2019

Related U.S. Application Data

(63) Continuation of application No. 15/156,556, filed on May 17, 2016, now abandoned, which is a
(Continued)

(51) Int. Cl.
*H04W 52/02* (2009.01)
*H04L 12/12* (2006.01)

(52) U.S. Cl.
CPC ......... *H04W 52/0206* (2013.01); *H04L 12/12* (2013.01); *Y02D 70/00* (2018.01);
(Continued)

(58) Field of Classification Search
None
See application file for complete search history.

(56) References Cited

U.S. PATENT DOCUMENTS

| 4,449,246 A | 5/1984 | Seiler et al. |
| 4,665,560 A | 5/1987 | Lange |

(Continued)

FOREIGN PATENT DOCUMENTS

| CN | 1764123 A | 4/2006 |
| CN | 101030162 A | 9/2007 |

(Continued)

OTHER PUBLICATIONS

Non-Final Office Action for U.S. Appl. No. 13/687,457, dated Jul. 10, 2018, 39 pages.
(Continued)

*Primary Examiner* — Lana N Le
(74) *Attorney, Agent, or Firm* — C. Keith Montgomery

(57) ABSTRACT

Selective activation of communications services on power-up of a remote unit(s) in a wireless communication system (WCS) based on power consumption is disclosed. To avoid a remote unit drawing more power than is allowed and risking shutting down all of its communications services, after a remote unit in the WCS is powered-up to start its operations, the remote unit selectively activates its different communications services. The remote unit selectively activates communications services based on the power consumption of the remote unit to avoid the remote unit drawing more power than is allowed. If activating a next communications service would cause the remote unit to draw more power than is allowed, the remote unit discontinues activating additional communications services. In this manner, the already activated communications services in the remote unit can remain operational without risking powering down of the remote unit and discontinuing all of its communications services.

22 Claims, 9 Drawing Sheets

Related U.S. Application Data continuation of application No. PCT/IL2014/051012, filed on Nov. 20, 2014.

(60) Provisional application No. 61/908,893, filed on Nov. 26, 2013.

(52) U.S. Cl.
CPC ...... *Y02D 70/1224* (2018.01); *Y02D 70/1242* (2018.01); *Y02D 70/1262* (2018.01); *Y02D 70/142* (2018.01); *Y02D 70/166* (2018.01)

(56) References Cited

U.S. PATENT DOCUMENTS

| | | |
|---|---|---|
| 4,939,852 A | 7/1990 | Brenner |
| 4,972,346 A | 11/1990 | Kawano et al. |
| 5,056,109 A | 10/1991 | Gilhousen et al. |
| 5,138,679 A | 8/1992 | Edwards et al. |
| 5,187,803 A | 2/1993 | Sohner et al. |
| 5,206,655 A | 4/1993 | Caille et al. |
| 5,208,812 A | 5/1993 | Dudek et al. |
| 5,278,989 A | 1/1994 | Burke et al. |
| 5,280,472 A | 1/1994 | Gilhousen et al. |
| 5,329,604 A | 7/1994 | Baldwin et al. |
| 5,381,459 A | 1/1995 | Lappington |
| 5,396,224 A | 3/1995 | Dukes et al. |
| 5,420,863 A | 5/1995 | Taketsugu et al. |
| 5,432,838 A | 7/1995 | Purchase et al. |
| 5,436,827 A | 7/1995 | Gunn et al. |
| 5,519,830 A | 5/1996 | Opoczynski |
| 5,534,854 A | 7/1996 | Bradbury et al. |
| 5,559,831 A | 9/1996 | Keith |
| 5,598,314 A | 1/1997 | Hall |
| 5,606,725 A | 2/1997 | Hart |
| 5,668,562 A | 9/1997 | Cutrer et al. |
| 5,682,256 A | 10/1997 | Motley et al. |
| 5,708,681 A | 1/1998 | Malkemes et al. |
| 5,726,984 A | 3/1998 | Kubler et al. |
| 5,765,099 A | 6/1998 | Georges et al. |
| 5,774,316 A | 6/1998 | McGary et al. |
| 5,790,536 A | 8/1998 | Mahany et al. |
| 5,802,173 A | 9/1998 | Hamilton-Piercy et al. |
| 5,809,395 A | 9/1998 | Hamilton-Piercy et al. |
| 5,809,431 A | 9/1998 | Bustamante et al. |
| 5,818,883 A | 10/1998 | Smith et al. |
| 5,839,052 A | 11/1998 | Dean et al. |
| 5,862,460 A | 1/1999 | Rich |
| 5,867,763 A | 2/1999 | Dean et al. |
| 5,889,469 A | 3/1999 | Mykytiuk et al. |
| 5,953,670 A | 9/1999 | Newson |
| 5,969,837 A | 10/1999 | Farber et al. |
| 5,983,070 A | 11/1999 | Georges et al. |
| 6,006,069 A | 12/1999 | Langston |
| 6,011,980 A | 1/2000 | Nagano et al. |
| 6,014,546 A | 1/2000 | Georges et al. |
| 6,037,898 A | 3/2000 | Parish et al. |
| 6,060,879 A | 5/2000 | Mussenden |
| 6,069,721 A | 5/2000 | Oh et al. |
| 6,118,767 A | 9/2000 | Shen et al. |
| 6,122,529 A | 9/2000 | Sabat, Jr. et al. |
| 6,125,048 A | 9/2000 | Loughran et al. |
| 6,128,477 A | 10/2000 | Freed |
| 6,157,810 A | 12/2000 | Georges et al. |
| 6,163,266 A | 12/2000 | Fasullo et al. |
| 6,188,876 B1 | 2/2001 | Kim |
| 6,192,216 B1 | 2/2001 | Sabat, Jr. et al. |
| 6,194,968 B1 | 2/2001 | Winslow |
| 6,212,274 B1 | 4/2001 | Ninh |
| 6,212,397 B1 | 4/2001 | Langston et al. |
| 6,222,503 B1 | 4/2001 | Gietema |
| 6,223,201 B1 | 4/2001 | Reznak |
| 6,236,863 B1 | 5/2001 | Waldroup et al. |
| 6,275,990 B1 | 8/2001 | Dapper et al. |
| 6,279,158 B1 | 8/2001 | Geile et al. |
| 6,295,451 B1 | 9/2001 | Mimura |
| 6,307,869 B1 | 10/2001 | Pawelski |
| 6,317,599 B1 | 11/2001 | Rappaport et al. |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,340,932 B1 | 1/2002 | Rodgers et al. |
| 6,353,600 B1 | 3/2002 | Schwartz et al. |
| 6,366,774 B1 | 4/2002 | Ketonen et al. |
| 6,370,203 B1 | 4/2002 | Boesch et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,405,018 B1 | 6/2002 | Reudink et al. |
| 6,415,132 B1 | 7/2002 | Sabat, Jr. |
| 6,421,327 B1 | 7/2002 | Lundby |
| 6,448,558 B1 | 9/2002 | Greene |
| 6,452,915 B1 | 9/2002 | Jorgensen |
| 6,480,702 B1 | 11/2002 | Sabat, Jr. |
| 6,496,290 B1 | 12/2002 | Lee |
| 6,519,449 B1 | 2/2003 | Zhang et al. |
| 6,535,330 B1 | 3/2003 | Lelic et al. |
| 6,535,720 B1 | 3/2003 | Kintis et al. |
| 6,551,065 B2 | 4/2003 | Lee |
| 6,580,402 B2 | 6/2003 | Navarro et al. |
| 6,580,905 B1 | 6/2003 | Naidu et al. |
| 6,584,197 B1 | 6/2003 | Boudreaux, Jr. et al. |
| 6,587,514 B1 | 7/2003 | Wright et al. |
| 6,588,943 B1 | 7/2003 | Howard |
| 6,598,009 B2 | 7/2003 | Yang |
| 6,615,074 B2 | 9/2003 | Mickle et al. |
| 6,628,732 B1 | 9/2003 | Takaki |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,678,509 B2 | 1/2004 | Skarman et al. |
| 6,704,298 B1 | 3/2004 | Matsumiya et al. |
| 6,745,013 B1 | 6/2004 | Porter et al. |
| 6,763,226 B1 | 7/2004 | McZeal, Jr. |
| 6,785,558 B1 | 8/2004 | Stratford et al. |
| 6,801,767 B1 | 10/2004 | Schwartz et al. |
| 6,823,174 B1 | 11/2004 | Masenten et al. |
| 6,826,163 B2 | 11/2004 | Mani et al. |
| 6,836,660 B1 | 12/2004 | Wala |
| 6,836,673 B1 | 12/2004 | Trott |
| 6,842,433 B2 | 1/2005 | West et al. |
| 6,850,510 B2 | 2/2005 | Kubler |
| 6,876,056 B2 | 4/2005 | Tilmans et al. |
| 6,882,311 B2 | 4/2005 | Walker et al. |
| 6,885,344 B2 | 4/2005 | Mohamadi |
| 6,919,858 B2 | 7/2005 | Rofougaran |
| 6,931,659 B1 | 8/2005 | Kinemura |
| 6,934,511 B1 | 8/2005 | Lovinggood et al. |
| 6,934,541 B2 | 8/2005 | Miyatani |
| 6,937,878 B2 | 8/2005 | Kim et al. |
| 6,941,112 B2 | 9/2005 | Hasegawa |
| 6,961,312 B2 | 11/2005 | Kubler et al. |
| 6,977,502 B1 | 12/2005 | Hertz |
| 6,984,073 B2 | 1/2006 | Cox |
| 7,015,826 B1 | 3/2006 | Chan et al. |
| 7,020,488 B1 | 3/2006 | Bleile et al. |
| 7,024,166 B2 | 4/2006 | Wallace |
| 7,039,399 B2 | 5/2006 | Fischer |
| 7,043,271 B1 | 5/2006 | Seto et al. |
| 7,050,017 B2 | 5/2006 | King et al. |
| 7,053,648 B2 | 5/2006 | DeVey |
| 7,053,838 B2 | 5/2006 | Judd |
| 7,069,577 B2 | 6/2006 | Geile et al. |
| 7,072,586 B2 | 7/2006 | Aburakawa et al. |
| 7,073,953 B2 | 7/2006 | Roth et al. |
| 7,103,119 B2 | 9/2006 | Matsuoka et al. |
| 7,103,377 B2 | 9/2006 | Bauman et al. |
| 7,110,795 B2 | 9/2006 | Doi |
| 7,142,125 B2 | 11/2006 | Larson et al. |
| 7,142,535 B2 | 11/2006 | Kubler et al. |

(56) References Cited

U.S. PATENT DOCUMENTS

| | | | |
|---|---|---|---|
| 7,142,619 | B2 | 11/2006 | Sommer et al. |
| 7,144,255 | B2 | 12/2006 | Seymour |
| 7,171,244 | B2 * | 1/2007 | Bauman ............... H04B 7/0842 455/426.1 |
| 7,177,728 | B2 | 2/2007 | Gardner |
| 7,184,728 | B2 | 2/2007 | Solum |
| 7,190,748 | B2 | 3/2007 | Kim et al. |
| 7,194,023 | B2 | 3/2007 | Norrell et al. |
| 7,199,443 | B2 | 4/2007 | Elsharawy |
| 7,202,646 | B2 | 4/2007 | Vinciarelli |
| 7,269,311 | B2 | 9/2007 | Kim et al. |
| 7,315,735 | B2 | 1/2008 | Graham |
| 7,359,647 | B1 | 4/2008 | Faria et al. |
| 7,359,674 | B2 | 4/2008 | Markki et al. |
| 7,366,151 | B2 | 4/2008 | Kubler et al. |
| 7,369,526 | B2 | 5/2008 | Lechleider et al. |
| 7,388,892 | B2 | 6/2008 | Nishiyama et al. |
| 7,392,025 | B2 | 6/2008 | Rooyen et al. |
| 7,412,224 | B2 | 8/2008 | Kotola et al. |
| 7,417,443 | B2 | 8/2008 | Admon et al. |
| 7,450,853 | B2 | 11/2008 | Kim et al. |
| 7,451,365 | B2 | 11/2008 | Wang et al. |
| 7,454,171 | B2 | 11/2008 | Palin et al. |
| 7,460,507 | B2 | 12/2008 | Kubler et al. |
| 7,469,105 | B2 | 12/2008 | Wake et al. |
| 7,483,711 | B2 | 1/2009 | Burchfiel |
| 7,486,782 | B1 | 2/2009 | Roos |
| 7,505,747 | B2 | 3/2009 | Solum |
| 7,512,419 | B2 | 3/2009 | Solum |
| 7,515,526 | B2 | 4/2009 | Elkayam et al. |
| 7,526,303 | B2 | 4/2009 | Chary |
| 7,539,509 | B2 | 5/2009 | Bauman et al. |
| 7,542,452 | B2 | 6/2009 | Penumetsa |
| 7,545,055 | B2 | 6/2009 | Barrass |
| 7,546,138 | B2 | 6/2009 | Bauman |
| 7,548,138 | B2 | 6/2009 | Kamgaing |
| 7,551,641 | B2 | 6/2009 | Pirzada et al. |
| 7,557,758 | B2 | 7/2009 | Rofougaran |
| 7,567,579 | B2 | 7/2009 | Korcharz et al. |
| 7,580,384 | B2 | 8/2009 | Kubler et al. |
| 7,585,119 | B2 | 9/2009 | Sasaki |
| 7,586,861 | B2 | 9/2009 | Kubler et al. |
| 7,587,559 | B2 | 9/2009 | Brittain et al. |
| 7,599,420 | B2 | 10/2009 | Forenza et al. |
| 7,610,046 | B2 | 10/2009 | Wala |
| 7,619,535 | B2 | 11/2009 | Chen et al. |
| 7,627,250 | B2 | 12/2009 | George et al. |
| 7,630,690 | B2 | 12/2009 | Kaewell, Jr. et al. |
| 7,633,934 | B2 | 12/2009 | Kubler et al. |
| 7,639,982 | B2 | 12/2009 | Wala |
| 7,646,743 | B2 | 1/2010 | Kubler et al. |
| 7,646,777 | B2 | 1/2010 | Hicks, III et al. |
| 7,650,519 | B1 | 1/2010 | Hobbs et al. |
| 7,653,397 | B2 | 1/2010 | Pernu et al. |
| 7,668,565 | B2 | 2/2010 | Ylänen et al. |
| 7,688,811 | B2 | 3/2010 | Kubler et al. |
| 7,693,486 | B2 | 4/2010 | Kasslin et al. |
| 7,697,467 | B2 | 4/2010 | Kubler et al. |
| 7,715,375 | B2 | 5/2010 | Kubler et al. |
| 7,751,374 | B2 | 7/2010 | Donovan |
| 7,751,838 | B2 | 7/2010 | Ramesh et al. |
| 7,760,703 | B2 | 7/2010 | Kubler et al. |
| 7,761,718 | B2 | 7/2010 | Yasuo et al. |
| 7,768,951 | B2 | 8/2010 | Kubler et al. |
| 7,773,573 | B2 | 8/2010 | Chung et al. |
| 7,778,603 | B2 | 8/2010 | Palin et al. |
| 7,809,012 | B2 | 10/2010 | Ruuska et al. |
| 7,812,766 | B2 | 10/2010 | Leblanc et al. |
| 7,817,969 | B2 | 10/2010 | Castaneda et al. |
| 7,835,328 | B2 | 11/2010 | Stephens et al. |
| 7,848,316 | B2 | 12/2010 | Kubler et al. |
| 7,848,770 | B2 | 12/2010 | Scheinert |
| 7,852,228 | B2 | 12/2010 | Teng et al. |
| 7,853,234 | B2 | 12/2010 | Afsahi |
| 7,870,321 | B2 | 1/2011 | Rofougaran |
| 7,881,755 | B1 | 2/2011 | Mishra et al. |
| 7,894,423 | B2 | 2/2011 | Kubler et al. |
| 7,899,007 | B2 | 3/2011 | Kubler et al. |
| 7,899,395 | B2 | 3/2011 | Martch et al. |
| 7,904,115 | B2 * | 3/2011 | Hageman ......... H04W 52/0261 455/561 |
| 7,907,972 | B2 | 3/2011 | Walton et al. |
| 7,912,043 | B2 | 3/2011 | Kubler et al. |
| 7,916,706 | B2 | 3/2011 | Kubler et al. |
| 7,917,177 | B2 | 3/2011 | Bauman |
| 7,920,553 | B2 | 4/2011 | Kubler et al. |
| 7,920,858 | B2 | 4/2011 | Sabat, Jr. et al. |
| 7,924,783 | B1 | 4/2011 | Mahany et al. |
| 7,936,713 | B2 | 5/2011 | Kubler et al. |
| 7,949,364 | B2 | 5/2011 | Kasslin et al. |
| 7,957,777 | B1 | 6/2011 | Vu et al. |
| 7,962,111 | B2 | 6/2011 | Solum |
| 7,969,009 | B2 | 6/2011 | Chandrasekaran |
| 7,969,911 | B2 | 6/2011 | Mahany et al. |
| 7,970,428 | B2 | 6/2011 | Lin et al. |
| 7,990,925 | B2 | 8/2011 | Tinnakornsrisuphap et al. |
| 7,996,020 | B1 | 8/2011 | Chhabra |
| 8,001,397 | B2 | 8/2011 | Hansalia |
| 8,018,907 | B2 | 9/2011 | Kubler et al. |
| 8,036,157 | B2 | 10/2011 | Hanabusa et al. |
| 8,036,308 | B2 | 10/2011 | Rofougaran |
| 8,068,937 | B2 | 11/2011 | Eaves |
| 8,078,894 | B1 | 12/2011 | Ogami |
| 8,082,353 | B2 | 12/2011 | Huber et al. |
| 8,086,192 | B2 | 12/2011 | Rofougaran et al. |
| 8,155,525 | B2 * | 4/2012 | Cox ................. H04B 10/808 398/115 |
| 8,270,838 | B2 | 9/2012 | Cox |
| 8,270,990 | B2 | 9/2012 | Zhao |
| 8,306,563 | B2 | 11/2012 | Zavadsky et al. |
| 8,328,145 | B2 | 12/2012 | Smith |
| 8,406,941 | B2 | 3/2013 | Smith |
| 8,417,979 | B2 | 4/2013 | Maroney |
| 8,457,562 | B2 | 6/2013 | Zavadsky et al. |
| 8,514,092 | B2 | 8/2013 | Cao et al. |
| 8,532,492 | B2 | 9/2013 | Palanisamy et al. |
| 8,548,330 | B2 | 10/2013 | Berlin et al. |
| 8,588,614 | B2 | 11/2013 | Larsen |
| 8,620,375 | B2 | 12/2013 | Kim et al. |
| 8,622,632 | B2 | 1/2014 | Isenhour et al. |
| 8,649,684 | B2 | 2/2014 | Casterline et al. |
| 8,744,390 | B2 | 6/2014 | Stratford |
| 8,781,637 | B2 | 7/2014 | Eaves |
| 8,830,035 | B2 | 9/2014 | Lindley et al. |
| 8,831,428 | B2 | 9/2014 | Kobyakov et al. |
| 8,831,593 | B2 | 9/2014 | Melester et al. |
| 8,855,832 | B2 | 10/2014 | Rees |
| 8,930,736 | B2 | 1/2015 | James |
| 8,971,903 | B2 | 3/2015 | Hossain et al. |
| 8,994,276 | B2 | 3/2015 | Recker et al. |
| 9,026,036 | B2 | 5/2015 | Saban et al. |
| 9,160,449 | B2 | 10/2015 | Heidler et al. |
| 9,166,690 | B2 | 10/2015 | Brower et al. |
| 9,184,795 | B2 | 11/2015 | Eaves |
| 9,223,336 | B2 | 12/2015 | Petersen et al. |
| 9,252,874 | B2 | 2/2016 | Heidler et al. |
| 9,343,797 | B2 | 5/2016 | Shoemaker et al. |
| 9,419,436 | B2 | 8/2016 | Eaves et al. |
| 9,699,723 | B2 | 7/2017 | Heidler et al. |
| 9,853,689 | B2 | 12/2017 | Eaves |
| 2001/0036199 | A1 | 11/2001 | Terry |
| 2002/0051434 | A1 | 5/2002 | Ozluturk et al. |
| 2002/0097031 | A1 | 7/2002 | Cook et al. |
| 2002/0123365 | A1 | 9/2002 | Thorson et al. |
| 2002/0180554 | A1 | 12/2002 | Clark et al. |
| 2003/0111909 | A1 | 6/2003 | Liu et al. |
| 2003/0146765 | A1 | 8/2003 | Darshan et al. |
| 2003/0147353 | A1 | 8/2003 | Clarkson et al. |
| 2003/0178979 | A1 | 9/2003 | Cohen |
| 2004/0095907 | A1 | 5/2004 | Agee et al. |
| 2004/0146020 | A1 | 7/2004 | Kubler et al. |
| 2004/0151164 | A1 | 8/2004 | Kubler et al. |
| 2004/0160912 | A1 | 8/2004 | Kubler et al. |
| 2004/0160913 | A1 | 8/2004 | Kubler et al. |

(56) References Cited

U.S. PATENT DOCUMENTS

| | | |
|---|---|---|
| 2004/0165573 A1 | 8/2004 | Kubler et al. |
| 2004/0203704 A1 | 10/2004 | Ommodt et al. |
| 2004/0230846 A1 | 11/2004 | Mancey et al. |
| 2005/0047030 A1 | 3/2005 | Lee |
| 2005/0147071 A1 | 7/2005 | Karaoguz et al. |
| 2005/0197094 A1 | 9/2005 | Darshan et al. |
| 2005/0226625 A1 | 10/2005 | Wake et al. |
| 2005/0262364 A1 | 11/2005 | Diab et al. |
| 2005/0272439 A1 | 12/2005 | Picciriello et al. |
| 2006/0053324 A1 | 3/2006 | Giat et al. |
| 2006/0084379 A1 | 4/2006 | O'Neill |
| 2006/0192434 A1 | 8/2006 | Vrla et al. |
| 2006/0274704 A1 | 12/2006 | Desai et al. |
| 2007/0004467 A1 | 1/2007 | Chary |
| 2007/0058332 A1 | 3/2007 | Canterbury et al. |
| 2007/0060045 A1 | 3/2007 | Prautzsch |
| 2007/0060055 A1 | 3/2007 | Desai et al. |
| 2007/0076649 A1 | 4/2007 | Lin et al. |
| 2007/0166050 A1 | 7/2007 | Horio et al. |
| 2007/0224954 A1 | 9/2007 | Gopi |
| 2007/0286599 A1 | 12/2007 | Sauer et al. |
| 2007/0291732 A1 | 12/2007 | Todd et al. |
| 2007/0297005 A1 | 12/2007 | Montierth et al. |
| 2008/0002614 A1 | 1/2008 | Hanabusa et al. |
| 2008/0043714 A1 | 2/2008 | Pernu |
| 2008/0044186 A1 | 2/2008 | George et al. |
| 2008/0045271 A1 | 2/2008 | Azuma |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0129634 A1 | 6/2008 | Pera et al. |
| 2008/0134194 A1 | 6/2008 | Liu |
| 2008/0164890 A1 | 7/2008 | Admon et al. |
| 2008/0166094 A1 | 7/2008 | Bookbinder et al. |
| 2008/0167931 A1 | 7/2008 | Gerstemeier et al. |
| 2008/0186143 A1 | 8/2008 | George et al. |
| 2008/0207253 A1 | 8/2008 | Jaakkola et al. |
| 2008/0251071 A1 | 10/2008 | Armitstead et al. |
| 2008/0252307 A1 | 10/2008 | Schindler |
| 2008/0253351 A1 | 10/2008 | Pernu et al. |
| 2008/0261656 A1 | 10/2008 | Bella et al. |
| 2008/0268833 A1 | 10/2008 | Huang et al. |
| 2008/0272725 A1 | 11/2008 | Bojrup et al. |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2009/0007192 A1 | 1/2009 | Singh |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0040027 A1 | 2/2009 | Nakao |
| 2009/0055672 A1 | 2/2009 | Burkland et al. |
| 2009/0059903 A1 | 3/2009 | Kubler et al. |
| 2009/0061796 A1 | 3/2009 | Arkko et al. |
| 2009/0073916 A1 | 3/2009 | Zhang et al. |
| 2009/0100275 A1 | 4/2009 | Chang et al. |
| 2009/0121548 A1 | 5/2009 | Schindler et al. |
| 2009/0149221 A1 | 6/2009 | Liu et al. |
| 2009/0169163 A1 | 7/2009 | Abbott, III et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252205 A1 | 10/2009 | Rheinfelder et al. |
| 2009/0258652 A1 | 10/2009 | Lambert et al. |
| 2009/0280854 A1 | 11/2009 | Khan et al. |
| 2009/0285147 A1 | 11/2009 | Subasic et al. |
| 2009/0304387 A1 | 12/2009 | Farries et al. |
| 2010/0002626 A1 | 1/2010 | Schmidt et al. |
| 2010/0027443 A1 | 2/2010 | LoGalbo et al. |
| 2010/0054746 A1 | 3/2010 | Logan |
| 2010/0056184 A1 | 3/2010 | Vakil et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0106985 A1 | 4/2010 | Panguluri et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0148373 A1 | 6/2010 | Chandrasekaran |
| 2010/0156721 A1 | 6/2010 | Alamouti et al. |
| 2010/0188998 A1 | 7/2010 | Pernu et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0240302 A1 | 9/2010 | Buczkiewicz et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0290355 A1 | 11/2010 | Roy et al. |
| 2010/0290787 A1 | 11/2010 | Cox |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0322206 A1 | 12/2010 | Hole et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0021146 A1 | 1/2011 | Pernu |
| 2011/0021224 A1 | 1/2011 | Koskinen et al. |
| 2011/0055861 A1 | 3/2011 | Covell et al. |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0105110 A1 | 5/2011 | Carmon et al. |
| 2011/0116572 A1 | 5/2011 | Lee et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0172841 A1 | 7/2011 | Forbes, Jr. |
| 2011/0182230 A1 | 7/2011 | Ohm et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0241425 A1 | 10/2011 | Hunter, Jr. et al. |
| 2011/0244887 A1 | 10/2011 | Dupray et al. |
| 2011/0249715 A1 | 10/2011 | Choi et al. |
| 2011/0256878 A1 | 10/2011 | Zhu et al. |
| 2011/0260939 A1 | 10/2011 | Korva et al. |
| 2011/0266999 A1 | 11/2011 | Yodfat et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0009926 A1 | 1/2012 | Hevizi et al. |
| 2012/0033676 A1 | 2/2012 | Mundra et al. |
| 2012/0063377 A1 | 3/2012 | Osterling et al. |
| 2012/0099448 A1 | 4/2012 | Matsuo et al. |
| 2012/0106442 A1 | 5/2012 | Xiao |
| 2012/0120995 A1 | 5/2012 | Wurth |
| 2012/0122405 A1 | 5/2012 | Gerber et al. |
| 2012/0163829 A1 | 6/2012 | Cox |
| 2012/0196611 A1 | 8/2012 | Venkatraman et al. |
| 2012/0214538 A1 | 8/2012 | Kim et al. |

(56) References Cited

U.S. PATENT DOCUMENTS

| | | |
|---|---|---|
| 2012/0289224 A1 | 11/2012 | Hallberg et al. |
| 2012/0293390 A1 | 11/2012 | Shoemaker et al. |
| 2012/0307876 A1 | 12/2012 | Trachewsky et al. |
| 2012/0317426 A1* | 12/2012 | Hunter, Jr. .............. H04L 12/10 713/300 |
| 2012/0319916 A1 | 12/2012 | Gears et al. |
| 2013/0017863 A1 | 1/2013 | Kummetz et al. |
| 2013/0035047 A1 | 2/2013 | Chen et al. |
| 2013/0040676 A1 | 2/2013 | Kang et al. |
| 2013/0046415 A1 | 2/2013 | Curtis |
| 2013/0049469 A1 | 2/2013 | Huff et al. |
| 2013/0094425 A1 | 4/2013 | Soriaga et al. |
| 2013/0102309 A1 | 4/2013 | Chande et al. |
| 2013/0128929 A1 | 5/2013 | Clevorn et al. |
| 2013/0132683 A1 | 5/2013 | Ajanovic et al. |
| 2013/0137411 A1 | 5/2013 | Mann |
| 2013/0188959 A1 | 7/2013 | Cune et al. |
| 2013/0225182 A1 | 8/2013 | Singh et al. |
| 2013/0225183 A1 | 8/2013 | Meshkati et al. |
| 2013/0235726 A1 | 9/2013 | Frederiksen et al. |
| 2013/0249292 A1 | 9/2013 | Blackwell, Jr. et al. |
| 2013/0260706 A1 | 10/2013 | Singh |
| 2013/0295980 A1 | 11/2013 | Reuven et al. |
| 2013/0330086 A1 | 12/2013 | Berlin et al. |
| 2013/0337750 A1 | 12/2013 | Ko |
| 2014/0024402 A1 | 1/2014 | Singh |
| 2014/0037294 A1 | 2/2014 | Cox et al. |
| 2014/0050482 A1 | 2/2014 | Berlin et al. |
| 2014/0075217 A1 | 3/2014 | Wong et al. |
| 2014/0087742 A1 | 3/2014 | Brower et al. |
| 2014/0089688 A1 | 3/2014 | Man et al. |
| 2014/0089697 A1* | 3/2014 | Kim ......................... G06F 1/26 713/320 |
| 2014/0097846 A1 | 4/2014 | Lemaire et al. |
| 2014/0146692 A1 | 5/2014 | Hazani et al. |
| 2014/0148214 A1 | 5/2014 | Sasson |
| 2014/0153919 A1 | 6/2014 | Casterline et al. |
| 2014/0158781 A1 | 6/2014 | Kates |
| 2014/0169246 A1 | 6/2014 | Chui et al. |
| 2014/0233442 A1 | 8/2014 | Atlas et al. |
| 2014/0293894 A1 | 10/2014 | Saban et al. |
| 2014/0308043 A1 | 10/2014 | Heidler et al. |
| 2014/0308044 A1 | 10/2014 | Heidler et al. |
| 2015/0072632 A1 | 3/2015 | Pourkhaatoun et al. |
| 2015/0082066 A1 | 3/2015 | Bose et al. |
| 2015/0098350 A1 | 4/2015 | Mini et al. |
| 2015/0126251 A1 | 5/2015 | Hunter, Jr. et al. |
| 2015/0207318 A1 | 7/2015 | Lowe et al. |
| 2015/0215001 A1 | 7/2015 | Eaves |
| 2015/0249513 A1 | 9/2015 | Schwab et al. |
| 2015/0380928 A1 | 12/2015 | Saig et al. |
| 2016/0173291 A1 | 6/2016 | Hazani et al. |
| 2016/0294568 A1 | 10/2016 | Chawgo et al. |
| 2017/0055207 A1 | 2/2017 | Hagage et al. |
| 2017/0214236 A1 | 7/2017 | Eaves |
| 2017/0229886 A1 | 8/2017 | Eaves |
| 2018/0314311 A1* | 11/2018 | Tanaka ................... G06F 1/3234 |
| 2019/0097457 A1* | 3/2019 | Hazani ................. G01R 31/086 |

FOREIGN PATENT DOCUMENTS

| | | |
|---|---|---|
| CN | 101232179 A | 7/2008 |
| CN | 101803246 A | 8/2010 |
| CN | 101876962 A | 11/2010 |
| CN | 101299517 B | 12/2011 |
| EP | 0851618 A2 | 7/1998 |
| EP | 0924881 A2 | 6/1999 |
| EP | 1227605 A2 | 7/2002 |
| EP | 1347584 A2 | 9/2003 |
| EP | 1347607 A1 | 9/2003 |
| EP | 1954019 A1 | 8/2008 |
| EP | 1774700 B1 | 9/2010 |
| GB | 2275834 A | 9/1994 |
| JP | 58055770 A | 4/1983 |
| JP | 2002353813 A | 12/2002 |
| KR | 20040053467 A | 6/2004 |
| KR | 1031619 B1 | 4/2011 |
| WO | 9603823 A1 | 2/1996 |
| WO | 0072475 A1 | 11/2000 |
| WO | 0184760 A1 | 11/2001 |
| WO | 03024027 A1 | 3/2003 |
| WO | 2005117337 A1 | 12/2005 |
| WO | 2006077569 A1 | 7/2006 |
| WO | 2006077570 A1 | 7/2006 |
| WO | 2008083317 A1 | 7/2008 |
| WO | 2009014710 A1 | 1/2009 |
| WO | 2009145789 A1 | 12/2009 |
| WO | 2010090999 A1 | 8/2010 |
| WO | 2010132292 A1 | 11/2010 |
| WO | 2011123314 A1 | 10/2011 |
| WO | 2012051227 A1 | 4/2012 |
| WO | 2012051230 A1 | 4/2012 |
| WO | 2012064333 A1 | 5/2012 |
| WO | 2012071367 A1 | 5/2012 |
| WO | 2012103822 A2 | 8/2012 |
| WO | 2012115843 A1 | 8/2012 |
| WO | 2015049671 A2 | 4/2015 |

OTHER PUBLICATIONS

Advisory Action for U.S. Appl. No. 14/884,317, dated Oct. 10, 2017, 6 pages.
Non-Final Office Action for U.S. Appl. No. 15/049,621, dated Feb. 26, 2018, 15 pages.
Non-Final Office Action for U.S. Appl. No. 15/049,621, dated Jun. 22, 2018, 15 pages.
Advisory Action for U.S. Appl. No. 15/156,556, dated Oct. 4, 2017, 3 pages.
Non-Final Office Action for U.S. Appl. No. 15/156,556, dated May 3, 2018, 12 pages.
Non-Final Office Action for U.S. Appl. No. 15/228,375, dated Sep. 21, 2017, 10 pages.
Notice of Allowance for U.S. Appl. No. 15/228,375, dated Apr. 10, 2018, 8 pages.
Notice of Allowance for U.S. Appl. No. 15/585,688, dated Sep. 1, 2017, 8 pages.
Non-Final Office Action for U.S. Appl. No. 15/613,913, dated Feb. 8, 2018, 21 pages.
Notice of Allowance for U.S. Appl. No. 15/613,913, dated Aug. 1, 2018, 8 pages.
Notice of Allowance for U.S. Appl. No. 13/687,457, dated Nov. 20, 2018, 10 pages.
Final Office Action for U.S. Appl. No. 15/049,621, dated Nov. 2, 2018, 17 pages.
Final Office Action for U.S. Appl. No. 15/156,556, dated Sep. 26, 2018, 19 pages.
Non-Final Office Action for U.S. Appl. No. 16/031,173, dated Nov. 29, 2018, 14 pages.
Non-Final Office Action for U.S. Appl. No. 15/614,124, dated Jan. 14, 2019, 6 pages.
Advisory Action for U.S. Appl. No. 15/049,621, dated Jan. 3, 2019, 3 pages.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Author Unknown, "INT6400/INT1400: HomePlug AV Chip Set," Product Brief, Atheros Powerline Technology, 27003885 Revision 2, Atheros Communications, Inc., 2009, 2 pages.
Author Unknown, "MegaPlug Av: 200 Mbps Ethernet Adapter," Product Specifications, Actiontec Electronics, Inc., 2010, 2 pages.
Cho, Bong Youl et al. "The Forward Link Performance of a PCS System with an AGC," 4th CDMA International Conference and Exhibition, "The Realization of IMT-2000," 1999, 10 pages.
Chu, Ta-Shing et al. "Fiber optic microcellular radio", IEEE Transactions on Vehicular Technology, Aug. 1991, pp. 599-606, vol. 40, Issue 3.

(56) References Cited

OTHER PUBLICATIONS

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.
Dolmans, G. et al. "Performance study of an adaptive dual antenna handset for indoor communications", IEE Proceedings: Microwaves, Antennas and Propagation, Apr. 1999, pp. 138-144, vol. 146, Issue 2.
Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.
Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Windyka, John et al., "System-Level Integrated Circuit (SLIC) Technology Development for Phased Array Antenna Applications," Contractor Report 204132, National Aeronautics and Space Administration, Jul. 1997, 94 pages.
International Preliminary Report on Patentability for PCT/US2011/061761 dated May 28, 2013, 8 pages.
International Search Report for PCT/US2011/061761 dated Jan. 26, 2012, 3 pages.
Author Unknown, "Equivalent Circuits—(Thevenin and Norton)," Bucknell Lecture Notes, Wayback Machine, Mar. 25, 2010, http://www.facstaff.bucknell.edu/mastascu/elessonsHTML/Source/Source2.html, 15 pages.
International Search Report and Written Opinion for PCT/IL2014/050766, dated Nov. 11, 2014, 12 pages.
International Preliminary Report on Patentability for PCT/IL2014/050766, dated Mar. 10, 2016, 9 pages.
Advisory Action and Applicant-Initiated Interview Summary for U.S. Appl. No. 13/687,457, dated May 13, 2016, 5 pages.
Non-final Office Action for U.S. Appl. No. 13/687,457, dated Jun. 27, 2016, 30 pages.
Non-final Office Action for U.S. Appl. No. 13/899,118, dated Jun. 30, 2016, 11 pages.
Final Office Action for U.S. Appl. No. 14/317,475, dated May 26, 2016, 12 pages.
Notice of Allowance for U.S. Appl. No. 14/317,475, dated Aug. 5, 2016, 7 pages.
Notice of Allowance for U.S. Appl. No. 14/845,768, dated Apr. 11, 2016, 8 pages.
Notice of Allowance for U.S. Appl. No. 14/845,946, dated Jun. 8, 2016, 7 pages.
Final Office Action for U.S. Appl. No. 13/687,457, dated Feb. 10, 2017, 33 pages.
Advisory Action for U.S. Appl. No. 13/687,457, dated May 24, 2017, 7 pages.
Notice of Allowance for U.S. Appl. No. 13/899,118, dated Jan. 12, 2017, 7 pages.
Non-Final Office Action for U.S. Appl. No. 14/845,929, dated Nov. 7, 2016, 5 pages.
Notice of Allowance for U.S. Appl. No. 14/845,929, dated May 9, 2017, 7 pages.
Non-Final Office Action for U.S. Appl. No. 14/845,946, dated Sep. 9, 2016, 10 pages.
Notice of Allowance and Examiner-Initiated Interview Summary for U.S. Appl. No. 14/845,946, dated Apr. 20, 2017, 10 pages.
Non-Final Office Action for U.S. Appl. No. 14/853,118, dated Aug. 12, 2016, 7 pages.
Non-Final Office Action for U.S. Appl. No. 14/884,317, dated Aug. 31, 2016, 16 pages.
Non-Final Office Action for U.S. Appl. No. 14/884,317, dated Feb. 13, 2017, 17 pages.
Final Office Action for U.S. Appl. No. 14/884,317, dated Jul. 28, 2017, 26 pages.
Final Office Action for U.S. Appl. No. 15/156,556, dated Jul. 26, 2017, 16 pages.
Non-Final Office Action for U.S. Appl. No. 15/156,556, dated Apr. 11, 2017, 13 pages.
Non-Final Office Action for U.S. Appl. No. 14/961,098, dated Nov. 14, 2016, 10 pages.
International Search Report for PCT/US2010/056458 dated Aug. 2, 2011, 4 pages.
International Preliminary Report on Patentability for PCT/US2010/056458 dated May 23, 2013, 9 pages.
Non-final Office Action for U.S. Appl. No. 13/410,916 dated Jul. 18, 2012, 13 pages.
Notice of Allowance for U.S. Appl. No. 13/410,916 dated Aug. 9, 2012, 9 pages.
Author Unknown, "MDS SDx Packaged Stations," Technical Manual, MDS 05-6312A01, Revision B, May 2011, GE MDS, LLC, Rochester, New York, 44 pages.
Author Unknown, "Quad Integrated IEEE 802.3at PSE Controller and Power Management System with up to 30W per Port Capabilities," Product Brief, BCM59103, Broadcom Corporation, Oct. 12, 2009, 2 pages.
Author Unknown, "Quad IEEE 802.3at Power Over Ethernet Controller," Product Brief, LTC4266, Linear Technology Corporation, 2009, 2 pages.
Author Unknown, "Single IEEE 802.3at Power Over Ethernet Controller," Product Brief, LTC4274, Linear Technology Corporation, 2009, 2 pages.
Author Unknown, "TPS23841: High-Power, Wide Voltage Range, Quad-Port Ethernet Power Sourcing Equipment Manager," Texas Instruments Incorporated, Nov. 2006, Revised May 2007, 48 pages.
International Search Report for PCT/US2010/034005 dated Aug. 12, 2010, 4 pages.
International Preliminary Report on Patentability for PCT/US2010/034005 dated Nov. 24, 2011, 7 pages.
International Search Report for PCT/US2011/055858 dated Feb. 7, 2012, 4 pages.
International Preliminary Report on Patentability for PCT/US2011/055858 dated Apr. 25, 2013, 8 pages.
International Search Report for PCT/US2011/055861 dated Feb. 7, 2012, 4 pages.
International Preliminary Report on Patentability for PCT/US2011/055861 dated Apr. 25, 2013, 9 pages.
International Preliminary Report on Patentability for PCT/US2011/061761 dated Jun. 6, 2013, 9 pages.
Translation of the the First Office Action for Chinese Patent Application No. 201180059270.4 dated May 13, 2015, 19 pages.
International Search Report for PCT/US2013/058937 dated Jan. 14, 2014, 4 pages.
International Preliminary Report on Patentability for PCT/US2013/058937 dated Apr. 9, 2015, 7 pages.
Non-final Office Action for U.S. Appl. No. 13/626,371 dated Dec. 13, 2013, 15 pages.
Non-final Office Action for U.S. Appl. No. 13/626,371 dated Jun. 25, 2014, 16 pages.
Notice of Allowance for U.S. Appl. No. 13/626,371 dated Nov. 25, 2014, 7 pages.
Notice of Allowance for U.S. Appl. No. 13/626,371 dated Aug. 3, 2015, 7 pages.
Non-final Office Action for U.S. Appl. No. 13/859,985 dated Feb. 27, 2015, 15 pages.
Final Office Action for U.S. Appl. No. 13/859,985 dated Jul. 22, 2015, 8 pages.
Non-final Office Action for U.S. Appl. No. 13/860,017 dated Feb. 27, 2015, 15 pages.
Final Office Action for U.S. Appl. No. 13/860,017 dated Jul. 23, 2015, 8 pages.
Non-Final Office Action for U.S. Appl. No. 13/950,397, dated Mar. 17, 2015, 6 pages.

(56) References Cited

OTHER PUBLICATIONS

Notice of Allowance for U.S. Appl. No. 13/950,397, dated Jun. 10, 2015, 7 pages.
Non-Final Office Action for U.S. Appl. No. 13/771,756 dated Sep. 10, 2014, 26 pages.
Final Office Action for U.S. Appl. No. 13/771,756 dated Apr. 30, 2015, 38 pages.
International Search Report for PCT/IL2013/050976, dated Mar. 18, 2014, 3 pages.
Translation of the First Office Action for Chinese Patent Application No. 201180053270.3 dated May 26, 2015, 17 pages.
Translation of the First Office Action for Chinese Patent Application No. 201180052537.7 dated Jun. 25, 2015, 9 pages.
Non-final Office Action for U.S. Appl. No. 13/687,457 dated Jul. 30, 2015, 12 pages.
Advisory Action for U.S. Appl. No. 13/771,756, dated Aug. 21, 2015, 4 pages.
Non-final Office Action for U.S. Appl. No. 13/899,118, dated Jan. 6, 2016, 10 pages.
Non-final Office Action for U.S. Appl. No. 14/845,768, dated Nov. 19, 2015, 12 pages.
Non-final Office Action for U.S. Appl. No. 14/845,946, dated Dec. 17, 2015, 11 pages.
The Second Office Action for Chinese Patent Application No. 201180059270.4, dated Jan. 28, 2016, 42 pages.
Final Office Action for U.S. Appl. No. 13/687,457, dated Feb. 12, 2016, 22 pages.
Notice of Allowance for U.S. Appl. No. 13/771,756, dated Jan. 29, 2016, 14 pages.
International Search Report and Written Opinion for PCT/IL2015/050656, dated Oct. 8, 2015, 9 pages.
Non-final Office Action for U.S. Appl. No. 14/317,475, dated Feb. 3, 2016, 12 pages.
Author Unknown, "Fiber Optic Distributed Antenna System," Installation and Users Guide, ERAU Version 1.5, May 2002, Andrews Corporation, 53 pages.
International Search Report and Written Opinion for PCT/IL2014/051012, dated Mar. 5, 2015, 11 pages.
International Search Report and Written Opinion for International Patent Application No. PCT/IL2016/050306, dated Jun. 8, 2016, 14 pages.
The Third Office Action for Chinese Patent Application No. 201180059270.4, dated Aug. 23, 2016, 6 pages.
Translation of the Fourth Office Action for Chinese Patent Application No. 201180059270.4, dated Jan. 20, 2017, 6 pages.
International Search Report and Written Opinion PCT/IL2014/051012 dated Mar. 5, 2012.
Notice of Allowance for U.S. Appl. No. 15/614,124, dated Jun. 10, 2019, 7 pages.
Notice of Allowance for U.S. Appl. No. 16/031,173, dated May 9, 2019, 8 pages.
Notice of Allowance for U.S. Appl. No. 16/148,420, dated May 7, 2019, 8 pages.

\* cited by examiner

SELECTIVE ACTIVATION OF COMMUNICATIONS SERVICES ON POWER-UP OF A REMOTE UNIT(S) IN A WIRELESS COMMUNICATION SYSTEM (WCS) BASED ON POWER CONSUMPTION

PRIORITY APPLICATION

This application is a continuation of U.S. patent application Ser. No. 15/156,556, filed May 17, 2016, which is a continuation of International Application No. PCT/IL2014/051012, filed Nov. 20, 2014, which claims the benefit of priority to Provisional Application No. 61/908,893, filed Nov. 26, 2013, the contents of which are relied upon and incorporated herein by reference in their entireties.

BACKGROUND

The disclosure relates generally to distributed antenna systems (DASs) and more particularly to selective activation of communications services during remote unit power-up in a DAS based on power consumption.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. DASs are particularly useful to be deployed inside buildings or other indoor environments where client devices may not otherwise be able to effectively receive radio frequency (RF) signals from a source, such as a base station for example. Example applications where DASs can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas, also referred to as "antenna coverage areas." Antenna coverage areas can have a radius in the range from a few meters up to twenty meters as an example. One type of DAS for creating antenna coverage areas, called "Radio-over-Fiber" or "RoF," utilizes RF communications signals sent over optical fibers. Both types of systems can include head-end equipment coupled to a plurality of remote antenna units (RAUs) that each provides antenna coverage areas. The RAUs can each include RF transceivers coupled to an antenna to transmit RF communications signals wirelessly, wherein the RAUs are coupled to the head-end equipment via the communication medium. The RAUs contain power-consuming components, such as the RF transceiver, to transmit and receive RF communications signals and thus require power to operate. Power may be provided to the RAUs from remote power supplies, such as at an intermediate distribution frame (IDF), or interconnect unit (ICU) closet at each floor of the building infrastructure.

In this regard, FIG. 1 is a schematic diagram of an embodiment of a DAS. In this embodiment, the system is an optical fiber-based DAS 10. The DAS 10 is configured to create one or more antenna coverage areas for establishing communications with wireless client devices located in the RF range of the antenna coverage areas. The DAS 10 provides RF communication services (e.g., cellular services). In this embodiment, the DAS 10 includes head-end equipment (HEE) 12 such as a head-end unit (HEU), one or more remote antenna units (RAUs) 14, and an optical fiber 16 that optically couples the HEE 12 to the RAU 14. The RAU 14 is a type of remote communications unit. In general, a remote communications unit can support either wireless communications, wired communications, or both. The RAU 14 can support wireless communications and/or wired communications. The HEE 12 is configured to receive communications over downlink electrical RF signals 18D from a source or sources, such as a network or carrier, and provide such communications to the RAU 14. The HEE 12 is also configured to return communications received from the RAU 14, via uplink electrical RF signals 18U, back to the source. In this regard in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12.

The optical fiber-based DAS 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a cellular telephone. The client device 24 can be any device that is capable of receiving RF communications signals. The client device 24 includes an antenna 26 (e.g., a wireless card) adapted to receive and/or send electromagnetic RF signals. To communicate the electrical RF signals over the downlink optical fiber 16D to the RAU 14, to in turn be communicated to the client device 24 in the antenna coverage area 20 formed by the RAU 14, the HEE 12 includes a radio interface in the form of an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20. Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source.

In the DAS 10 in FIG. 1, the RAUs 14 are powered from a centralized power supply 38 in the HEE 12 through electrical conductors 40. The electrical conductors 40 may be provided in hybrid cables along with the downlink optical fiber 16D. The power is limited to specified power levels by regulations and/or by the power supply's capabilities. The power may be used to power several services at the RAU 14. However circumstances might arise in which the total power required for the operation of all services might exceed the maximum power level that the centralized power supply is allowed to provide. This situation might arise due to an increase in the power consumed by a communications service, such as due to a normal variation from the nominal power of the service or a failure in a service. Reduction in the ability of the system infrastructure to provide power, such as by high cable losses or improper settings for the power supply, can also cause the available power to exceed maximum power levels.

If a RAU 14 in the DAS 10 attempts to draw power in excess of the allowed power, the power supply 38 can shut down thereby shutting down operation of the RAU 14 and its communications services. The power supply 38 may renew power only after the power consumption goes below the maximum allowable power. This condition might require replacement of cabling or the RAU 14.

No admission is made that any reference cited herein constitutes prior art. Applicant expressly reserves the right to challenge the accuracy and pertinency of any cited documents.

SUMMARY

Aspects disclosed herein include selective activation of communications services on power-up of a remote unit in a distributed antenna system (DAS) based on power consumption. Related methods and systems are also disclosed. The remote units can each support a plurality of different communications services for a DAS. One or more power supplies are provided in the DAS to provide power to the power-consuming components that provide communications services in the remote units. If the power drawn by a remote unit exceeds the maximum power than can be drawn without overloading its power supply, the power supply may shut down thereby shutting down all of the communications services of the remote unit until power can be reestablished. In this regard, to avoid the remote unit drawing more power than is allowed and risking shutting down all of its communications services, after a remote unit in the DAS is powered-up to start its operations, the remote unit selectively activates its different communications services. The remote unit selectively activates communications services based on the power consumption of the remote unit to avoid the remote unit drawing more power than is allowed. If activating a next communications service would cause the remote unit to draw more power than is allowed, the remote unit discontinues activating additional communications services. In this manner, the already activated communications services in the remote unit can remain operational without risking powering down of the remote unit and discontinuing all of its communications services.

As one non-limiting example, the selective activation of communication services by a remote unit may be based on the remote unit determining and storing the communications services that were successfully activated prior to the remote unit being powered down due to drawing more power than allowed. In another non-limiting example, the selective activation of communications services by a remote unit may be based on measuring actual power consumption of the remote as communications services are activated during a power-up process and not activating additional communications services that would cause the remote unit to draw more power than allowed.

One embodiment of the disclosure relates to a remote unit for a DAS. The remote unit comprises a plurality of communications service circuits. Each of the plurality of communications service circuits are configured to process received respective communications signals for a respective communications service in the DAS. The remote unit also comprises a power selection circuit. The power selection circuit is configured to draw power over a power input from a power supply. The power selection circuit is also configured to selectively provide the drawn power to each of the plurality of communications service circuits based on a control signal. The remote unit also comprises a control circuit. The control circuit is configured to determine power consumption of the remote unit based on the drawn power from over the power input from the power supply. The control circuit is also configured to determine if the power consumption of the remote unit exceeds a defined threshold power level for the remote unit. The control circuit is also configured to generate the control signal to direct the power selection circuit to selectively provide the drawn power to one or more of the plurality of communications service circuits in a sequence to activate the one or more plurality of communications service circuits, such that the power consumption of the remote unit does not exceed the defined threshold power level.

An additional embodiment of the disclosure relates to a method of controlling power consumption of a remote unit in a DAS. The method comprises drawing power from a power supply in response to a power-up condition. The method also comprises determining power consumption of a remote unit based on the drawn power from the power supply. The method also comprises determining if the power consumption of the remote unit exceeds a predetermined power threshold level for the remote unit. The method also comprises selectively providing the drawn power to one or more plurality of communications service circuits each configured to receive respective communications signal for a respective communications service in the DAS in a sequence, to activate the one or more plurality of communications service circuits, based on the determined power consumption of the remote unit.

An additional embodiment of the disclosure relates to a non-transitory computer-readable medium having stored thereon computer executable instructions. The computer executable instructions, when executed, cause a processor in a remote unit in a DAS, to determine power consumption of a remote unit based on drawn power from a power supply. The computer executable instructions, when executed, also cause the processor in the remote unit to determine if the power consumption of the remote unit exceeds a predetermined power threshold level for the remote unit. The computer executable instructions, when executed, also cause the processor in the remote unit to selectively provide the drawn power to one or more plurality of communications service circuits each configured to receive respective communications signal for a respective communications service in the DAS in a sequence, to activate the one or more plurality of communications service circuits, based on the determined power consumption of the remote unit.

An additional embodiment of the disclosure relates to a method of powering remote units in a distributed communications system comprising a plurality of remote units, at least one power supply, head-end equipment configured to receive downlink radio frequency (RF) communications services signals and to communicate RF communications to the remote units, wherein at least one remote unit comprises a memory that maintains records related to service scenarios for the distributed communications system. The method comprises, in at least one remote unit, setting a first flag, corresponding to a first state of a first powering attempt and a second state for at least one subsequent powering attempt.

The method also comprises setting a second flag, corresponding to a service scenario numerator flag, encompassing a service scenario number that is under evaluation. The method also comprises setting a third flag, corresponding to an approved service scenario flag.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. [If there are no appended drawings, amend accordingly.

DETAILED DESCRIPTION

Various embodiments will be further clarified by the following examples.

Aspects disclosed herein include selective activation of communications services on power-up of a remote unit in a distributed antenna system (DAS) based on power consumption. Related methods and systems are also disclosed. The remote units can each support a plurality of different communications services for a DAS. One or more power supplies are provided in the DAS to provide power to the power-consuming components that provide communications services in the remote units. If the power drawn by a remote unit exceeds the maximum power than can be drawn without overloading its power supply, the power supply may shut down thereby shutting down all of the communications services of the remote unit until power can be reestablished. In this regard, to avoid the remote unit drawing more power than is allowed and risking shutting down all of its communications services, after a remote unit in the DAS is powered-up to start its operations, the remote unit selectively activates its different communications services. The remote unit selectively activates communications services based on the power consumption of the remote unit to avoid the remote unit drawing more power than is allowed. If activating a next communications service would cause the remote unit to draw more power than is allowed, the remote unit discontinues activating additional communications services. In this manner, the already activated communications services in the remote unit can remain operational without risking powering down of the remote unit and discontinuing all of its communications services.

Figure 2:
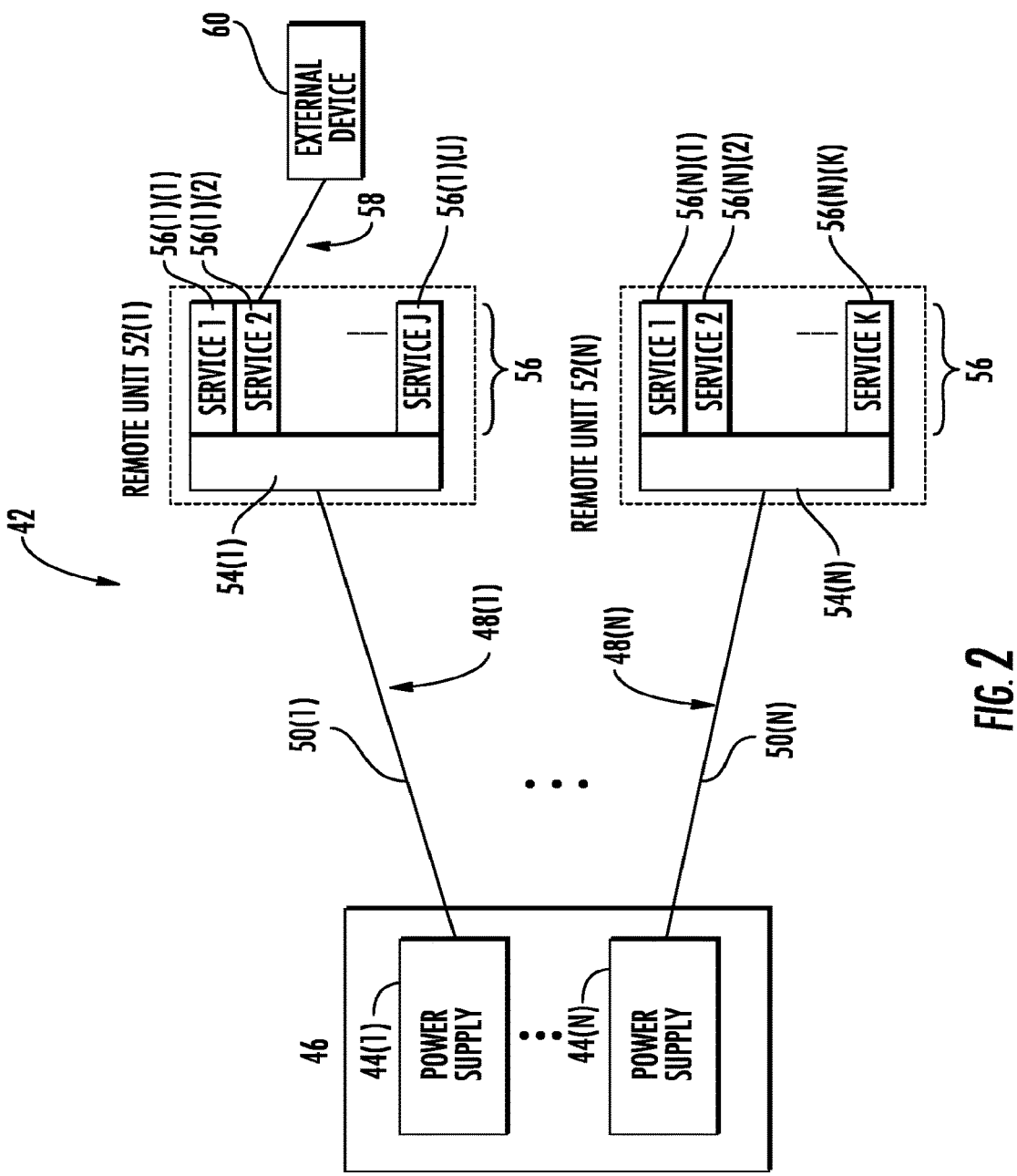
FIG. 2 is a schematic illustration of an exemplary DAS that includes centralized power supplies providing power to remote units for powering the communications services provided by the remote units.

In this regard, FIG. 2 is a schematic illustration of an exemplary DAS 42 that includes one or more centralized power supplies 44(1)-44(N) in head end equipment (HEE) 46 providing power 48(1)-48(N) over one or more pairs of electrical conductors 50(1)-50(N), respectively, to remote units 52(1)-52(N). 'N' can be any real positive integer to represent any number of remote units 52. The remote units 52(1)-52(N) draw the power 48(1)-48(N) from the power supplies 44(1)-44(N) to provide power to power-consuming components in the remote units 52(1)-52(N). Also note that the power supplies 44(1)-44(N) could be provided in other non-centralized locations, including in intervening equipment between the HEE 46 and the remote units 52(1)-52(N) or local or close proximity to the remote units 52(1)-52(N). The power supplies 44(1)-44(N) could be provided external to the respective remote units 52(1)-52(N) and/or internal to the respective remote units 52(1)-52(N).

With continuing reference to FIG. 2, in this example, each remote unit 52(1)-52(N) includes a power-consuming control circuit 54(1)-54(N) and one or more communications service circuits 56 for providing a communications service in the DAS 42. For example, the control circuits 54(1)-54(N) may provide for the overall functionality and control of the respective remote units 52(1)-52(N), including power-consuming communications service circuits 56 for supporting different communications services. For example, remote unit 52(1) may include 'J' number of communications service circuits 56(1)(1)-56(1)(J), whereas remote unit 52(N) may include 'K' number of communications service circuits 56(N)(1)-56(N)(K), as shown in FIG. 2. Each communications service circuits 56(1)(1)-56(1)(J) 56(N)(1)-56(N)(K) is configured to process communications signals for its respective communications service. An example of communications service circuits 56 may be circuits supporting certain frequency bands and/or a circuit for providing Ethernet connectivity 58 to an external device 60.

In this example, the remote units 52 may be provided that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The remote units 52 may also be provided in the DAS that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD). The remote units 52 may be provided that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

If a remote unit 52 in the DAS 42 in FIG. 2 attempts to draw power in excess of the power supplying capability of a respective power supply 44(1)-44(N), such power supply 44(1)-44(N) can shut down. This would cause the respective remote unit 52(1)-52(N) to also shut down, because power would not be available to be drawn to supply power to the respective control circuit 54(1)-54(N) and communications service circuits 56(1)(1)-56(1)(J)-56(N)(1)-56(N)(K). Thus, the communications services provided by the respective communications service circuits 56(1)(1)-56(1)(J)-56(N)(1)-56(N)(K) would be discontinued, thereby disrupting communications services provided by the communications services circuits 56(1)(1)-56(1)(J)-56(N)(1)-56(N)(K) and/or not allowing all communications service circuits 56(1)(1)-56(1)(J)-56(N)(1)-56(N)(K) to be powered to become operational. The shutdown power supply 44(1)-44(N) may renew power only after the power consumption of the respective remote unit(s) 52(1)-52(N) being powered draws power below the maximum allowable power that can be provided by the power supply 44(1)-44(N). Even after a shutdown power supply 44(1)-44(N) is reset, the condition that caused the respective remote unit 52(1)-52(N) to draw more power than can be provided by the power supply 44(1)-44(N) can continue to reoccur, thus causing the power supply 44(1)-44(N) to continue to reset. Thus, it would be desired to avoid a remote unit 52(1)-52(N) in the DAS 42 continuing to draw more power than can be supplied by a respective power supply 44(1)-44(N) thereby disrupting all communications services provided by the remote unit 52(1)-52(N) as a result of the power supply 44(1)-44(N) being reset in an overload condition.

Figure 3:
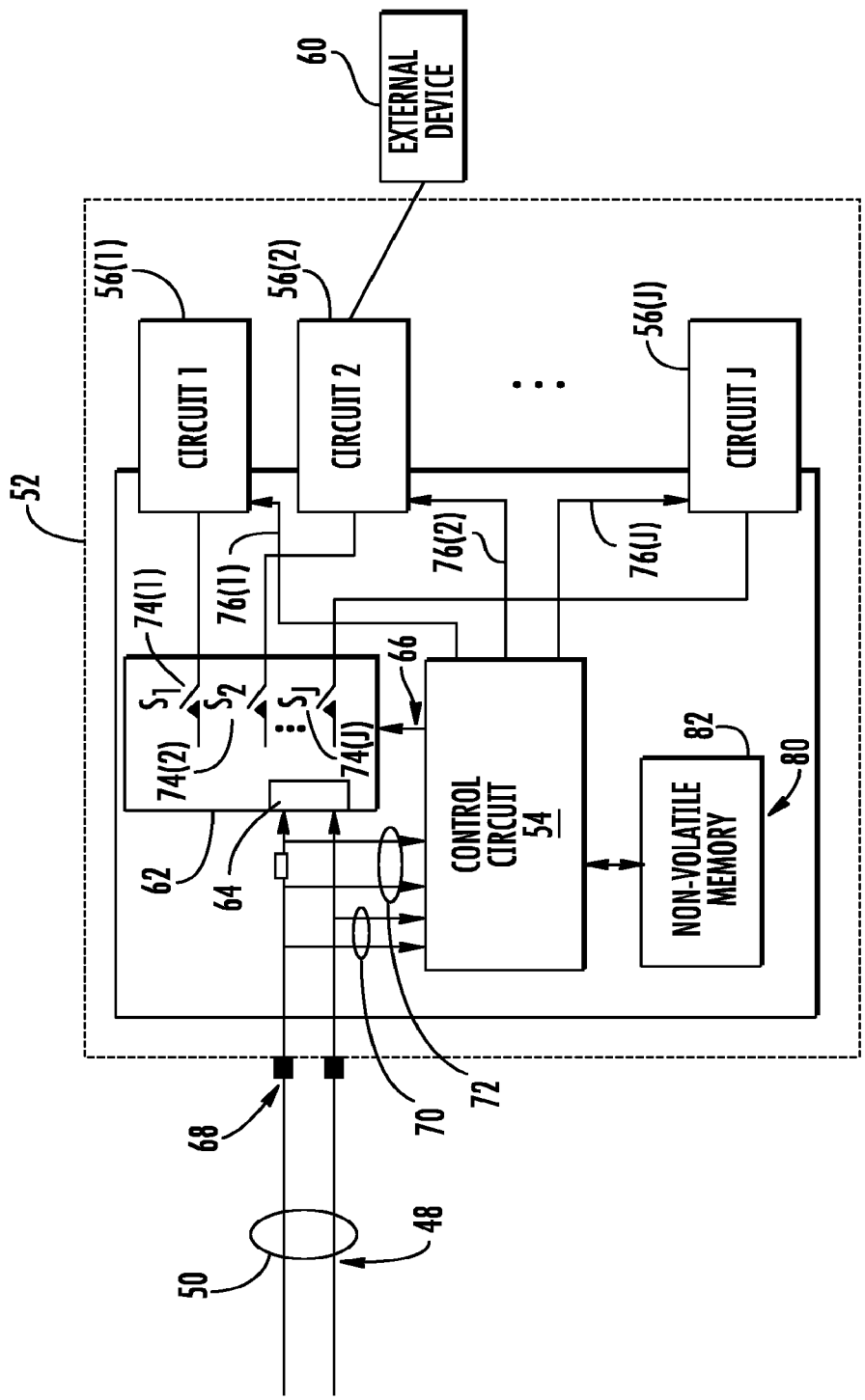
FIG. 3 is schematic of an exemplary remote unit that can be provided in a DAS, wherein the remote unit includes a control circuit configured to selectively activate communications services on power-up based on power consumption of the remote unit.

In this regard, FIG. 3 is schematic of the remote unit 52 that can be provided as any of the remote units 52(1)-52(N) in the DAS 42 in FIG. 2 that is configured to selectively activate its different communications service circuits 56(1)-56(J) based on the power consumption of the remote unit 52 to avoid the remote unit 52 drawing more power than is allowed. The remote unit 52 includes a power selection circuit 62. The power selection circuit 62 is configured to draw power 48 over a power input 64 from a power supply (not shown) and selectively provide the drawn power 48 to each of the communications service circuits 56(1)-56(J) based on a control signal 66 generated by the control circuit 54. The control circuit 54 is configured to determine the power consumption of the remote unit 52 based on the drawn power 48 from over the power input 64. In this example, the control circuit 54 senses the voltage and the current of the drawn power 48 at the input ports 68 of the remote unit 52 through sensing lines 70 and 72, respectively. For example, sensing of the input voltage and current of the power 48 may be done by an internal analog to digital converter (ADC) included in control circuit 54, or by a standalone analog to digital converter (ADC) external to the controller (not shown).

With continuing reference to FIG. 3, the control circuit 54 determines if the power consumption of the remote unit 52 exceeds a defined threshold power level for the remote unit 52. For example, the defined threshold power level for the remote unit 52 may be based on the maximum power rating of a power supply that supplies power to the remote unit 52. The control circuit 54 is then configured to generate the control signal 66 to direct the power selection circuit 62 to selectively provide the power 48 to the communications service circuits 56(1)-56(J) in a sequence (e.g., one by one) to activate the communications service circuits 56(1)-56(J), such that the power consumption of the remote unit 52 does not exceed the defined threshold power level. In this manner, even if the remote unit 52 cannot activate all of its communications service circuits 56(1)-56(J) to provide their respective communications services without drawing more power 48 than allowed, the remote unit 52 may be able to activate a subset of communications service circuits 56(1)-56(J) without drawing more power 48 than allowed.

With continuing reference to FIG. 3, in this example, the power selection circuit 62 contains a series of switches 74(1)-74(J) that are configured to selectively control whether received power 48 is provided to a respective communications service circuit 56(1)-56(J). The setting of the switches 74(1)-74(J) is controlled by the control signal 66 received by the control circuit 54, as discussed above. This allows the control circuit 54 to connect the communications service circuits 56(1)-56(J) to power 48 in a sequence, such as one at a time or all at the same time, if desired. Also, a series of control lines 76(1)-76(J) are provided that enable the control circuit 54 to shape communications service scenarios. For example, a first service scenario may be activation of communications service circuits 56 supporting the PCS band, where only two of the expected users are active. Or, a second communications service scenario may be the activation of another band where all users are utilizing half of the nominal power 48. The remote unit 52 also contains a memory 80 in the form of a non-volatile memory (NVM) 82 allows the control circuit 54 to maintain records (e.g., flags and a service scenario numerator) related to the communications service scenarios for selectively controlling power provided to the communications service circuits 56(1)-56(J). For example, the NVM 82 could be used to store the communications service circuits 56(1)-56(J) that are activated by the control circuit 54 such that if a power supply shutdown or reset occurs, the control circuit 54 will have a record of which communications service circuits 56(1)-56(J) were previously activated in a previous power cycle to then avoid providing power 48 to the same communications service circuits 56(1)-56(J) that caused the remote unit 52 to draw too much power in the previous power cycle. The NVM 82 could also be used to store the predetermined threshold power level that the remote unit 52 is allowed to draw as part of the process of selectively activating the communications service circuits 56(1)-56(J) during a power-up process.

Figure 4:
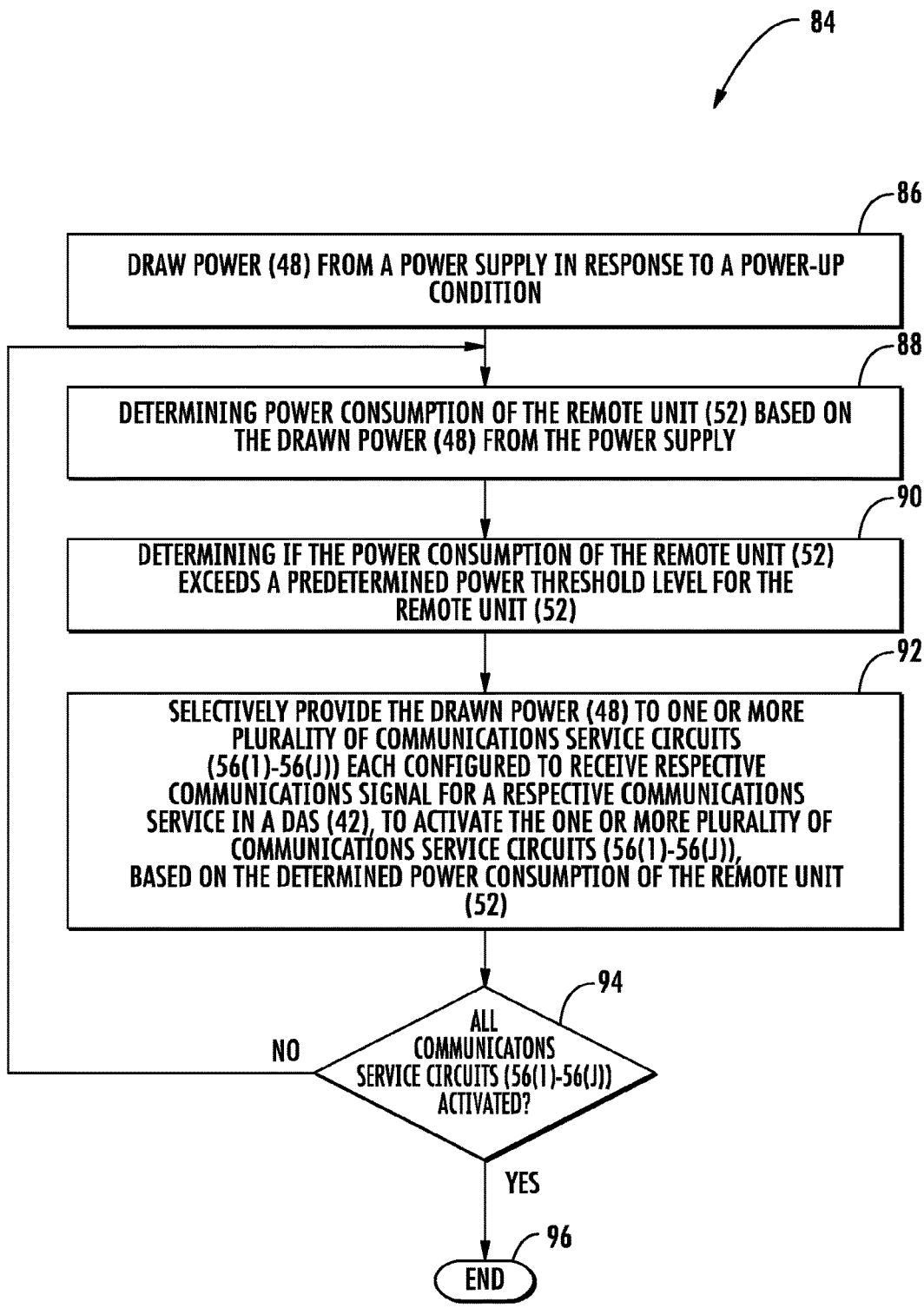
FIG. 4 is a flowchart illustrating an exemplary process of the remote unit in FIG. 3 determining if activating communications services will cause the remote unit to exceed power consumption limits during power-up operations and selectively activating communications services if activating the communications services will not cause the remote unit to exceed the power consumption limits.

FIG. 4 is a flowchart illustrating an exemplary power-up process 84 of the remote unit in FIG. 3 determining if activating communications services will cause the remote unit 52 to exceed power consumption limits during power-up operations and selectively activating communications service circuits 56(1)-56(J) if activating the communications services will not cause the remote unit 52 to exceed the power consumption limits. In this regard, the process begins by the remote unit 52 being powered-up and drawing the power 48 from a power supply in response to the power-up condition (block 86). The control circuit 54 will then determine the power consumption of the remote unit 52 based on the drawn power 48 (block 88). The control circuit 54 then determines if the power consumption of the remote unit 52 exceeds a predetermined power threshold level for the remote unit 52 (block 90). As discussed above, the predetermined power threshold level may be based on the maximum power rating of the power supply that supplies the power 48 to the remote unit 52. The control circuit 54 then selectively provides the drawn power 48 to the communication service circuits 56(1)-56(J) in a sequence to provide the power 48 to the communication service circuits 56(1)-56(J) (block 92). For example, the control circuit 54 may provide the drawn power 48 to the communication service circuits 56(1)-56(J) one at a time to then be able to determine if a next communication service circuit 56(1)-56(J) should be activated without drawing too much power 48.

With continuing reference to FIG. 4, if all the communications service circuits 56(1)-56(J) have not been activated (block 94), the control circuit 54 determines if the new power 48 consumption of the remote unit 52 exceeds the allowed power draw by returning to block 88. The control circuit 54 can repeat the process in blocks 88-92 until the control circuit 54 determines that another communications service circuit 56(1)-56(J) cannot be activated without the remote unit 48 drawing too much power or all communications service circuit 56(1)-56(J) were able to be activated. If all communications service circuit 56(1)-56(J) were able to be activated, the process ends (block 96). If the remote unit 52 is powered down and re-powered back up, the power-up process 84 in FIG. 4 will be repeated.

The control circuit 54 in the remote unit 52 in FIG. 3 can be programmed or designed to provide the exemplary power-up process 84 in FIG. 4 in different manners. As one non-limiting example, the selective activation of communications service circuits 56(1)-56(J) may be based on the control circuit 54 determining and storing the communications services that were successfully activated in the power-up process 84 prior to the remote unit 52 being powered down due to drawing more power than allowed, if such occurs. For example, the NVM 82 can be used by the control circuit 54 to record the communications services that were successfully activated during the power-up process 84, so that this information is available on a subsequent power-up process if power was shut down. In this manner, the control circuit 54 can determine which communications service circuits 56(1)-56(J) were successfully powered before power was shut down, to avoid attempting to activate other communications service circuits 56(1)-56(J) during a subsequent power-up process.

Figure 5:
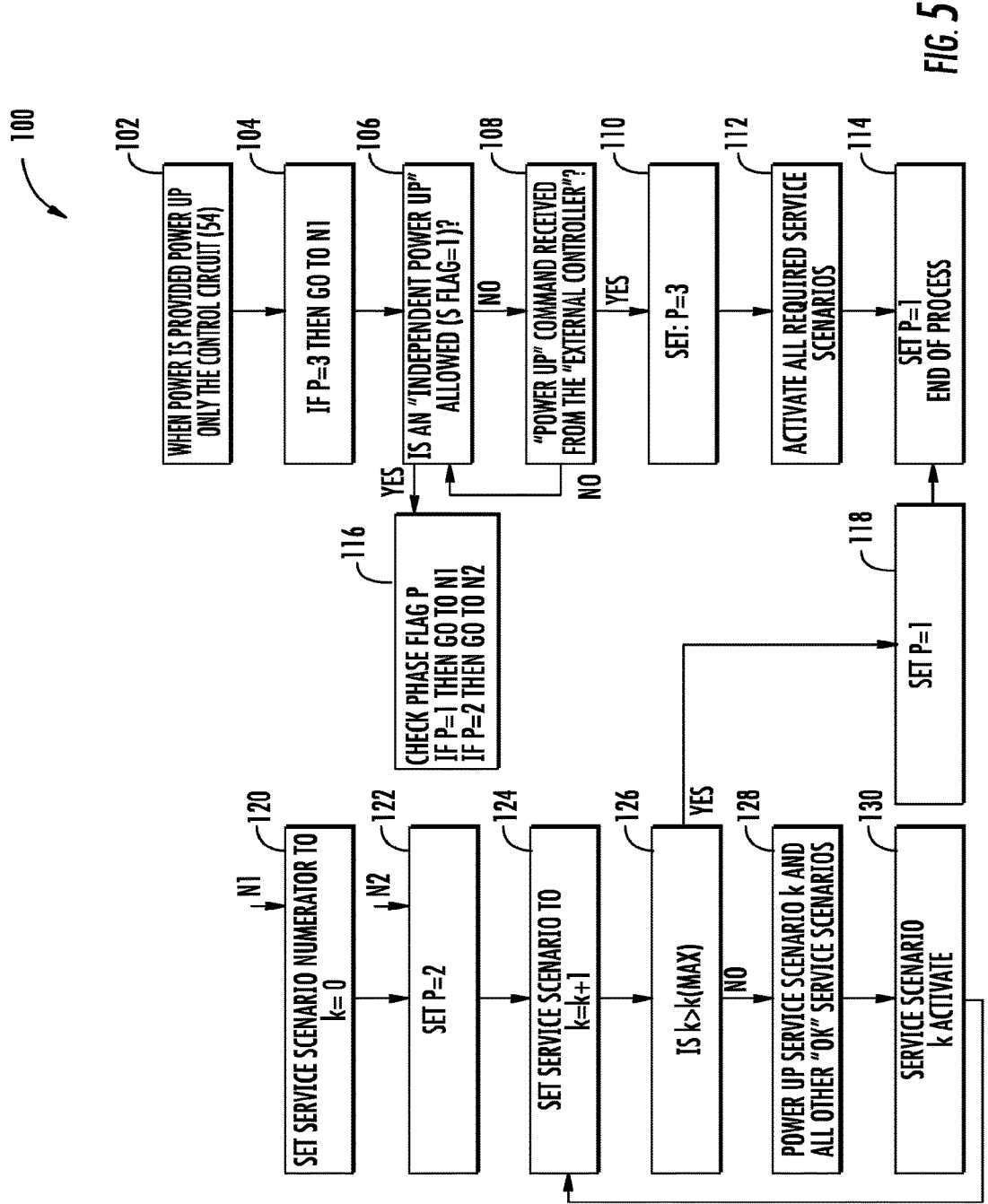
FIG. 5 is a flowchart illustrating an exemplary process of the remote unit in FIG. 3 selectively activating communications services based on the remote unit determining and storing the communications services that were successfully activated prior to the remote unit being powered down due to drawing more power than allowed.

In this regard, FIG. 5 is a flowchart illustrating an exemplary process 100 of the remote unit 52 in FIG. 3 selectively activating communications services based on the remote unit 52 determining and storing the communications services that were successfully activated prior to the remote unit 52 being powered down due to drawing more power than allowed. As will be discussed below, in this exemplary process 100, the control circuit 54 of the remote unit 52 is configured to be in one of the following two states. One state is that the power up process can be initiated only by an explicit command from an external controller. This state is flagged in the NVM 82 of the remote unit 52 by status flag being set to S=0. Another state is that the power up process is initiated independently when power is provided to the remote unit 52 set by the status flag in NVM 82 of the remote unit 52 being set by status flag S=1. In addition to the status flag, the remote unit 52 also uses a phase flag P which is stored in NVM 82 by the control circuit 54 during a power-up process of the remote unit 52 whenever the remote unit 52 enters or goes out of each phase of a power-up phase. In this manner, when the power is resumed, the control circuit 54 of the remote unit 52 can identify at which phase of the operation the power was shut down.

In this regard, the process starts by the power 48 being provided to the control circuit 54 of the remote unit 52 on power-up (block 102). The control circuit 54 checks to determine if a phase flag (P flag) stored in NVM 82 is set to P=3 at the beginning of the attempt to activate all communications service circuits 56(1)-56(J) without any pre-checking (block 104). When the phase flag P=3 is determined by the power process, it indicates that a power shutdown occurred during the first attempt by the control circuit 54 to activate all communications service circuits 56(1)-56(J) for all communications service scenarios at one time. In this scenario, the control circuit 54 sets the communications service scenario to k=0 (block 120) and sets the phase flag to P=2 (block 122). At this phase (marked in block 122 by P=2), the power shutdown may be a result of a faulty service scenario that consumes significantly more power than expected, the last added communications service scenario is operating normally, but the maximum power consumption level for the remote unit 52 was reached. The control circuit 54 then sets the service scenario to k=k+1 (block 124) to begin to activate the different communications service circuits 56(1)-56(J) one at a time. The control circuit 54 then determines if the number of communications service circuits 56(1)-56(J) activated is greater than the maximum number of communications service circuits 56(1)-56(J) that can be activated without drawing more power 48 than allowed (block 126). If not, the control circuit 54 activates by providing power to k communications services circuits 56(1)-56(J) (block 128) and stores the communications service scenario of activated communications service circuits 56(1)-56(J) to k (block 130). Thus, the phase flag being set to P=2 when the control circuit 54 enters the loop of activation of the service scenarios from being set in block 122 is an indication that a power shutdown occurred to the remote unit 52 during the activation of a service scenario k in block 128.

With continuing reference to FIG. 5, if the control circuit 54 then determines if the number of communications service circuits 56(1)-56(J) activated is greater than the maximum number of communications service circuits 56(1)-56(J) that can be activated without drawing more power 48 than allowed (block 126), the control circuit 54 sets the phase flag to P=1 (block 118), and the process ends (block 114). The phase flag being set to P=1 is an indication that the power-up cycle for the remote unit 52 is not a first time power up cycle, and indicates either a problem with one of the service scenarios or with the power supply caused the last power shut down after a period of operation.

With continuing reference to FIG. 5, if the phase flag was not P=3 at power-up in block 104, then the control circuit 54 determines if a status flag is set to S=1 to indicate that the power-up process was initiated independently by the remote unit 52 (block 106). If so, this means that the control circuit 54 has already previously attempted to activate the communications service circuits 56(1)-56(J) in a previous power-up cycle. The control circuit 54 checks to see if the phase flag stored in NVM 82 is set to P=1 or P=2, in which case the power-up process will go to step N1 in block 120 or N2 in block 122, respectively. When the phase flag set to P=2 is found at block 116, and power process branches to N2 in block 122 and starts checking whether other service scenarios can be added in block 126. If the status flag was not set to S=1 in block 106, the control circuit 54 determines if the power-up of the remote unit 52 was initiated by an external command and not by the remote unit 52 itself (block 108). If so, the phase flag is set to P=3 (block 110) to indicate that all communications service circuits 56(1)-56(J) should all be attempted to be activated without any pre-checking by the control circuit 54 (block 112). Thereafter, the phase flag is set to P=1 and the process ends (block 114).

Figure 6:
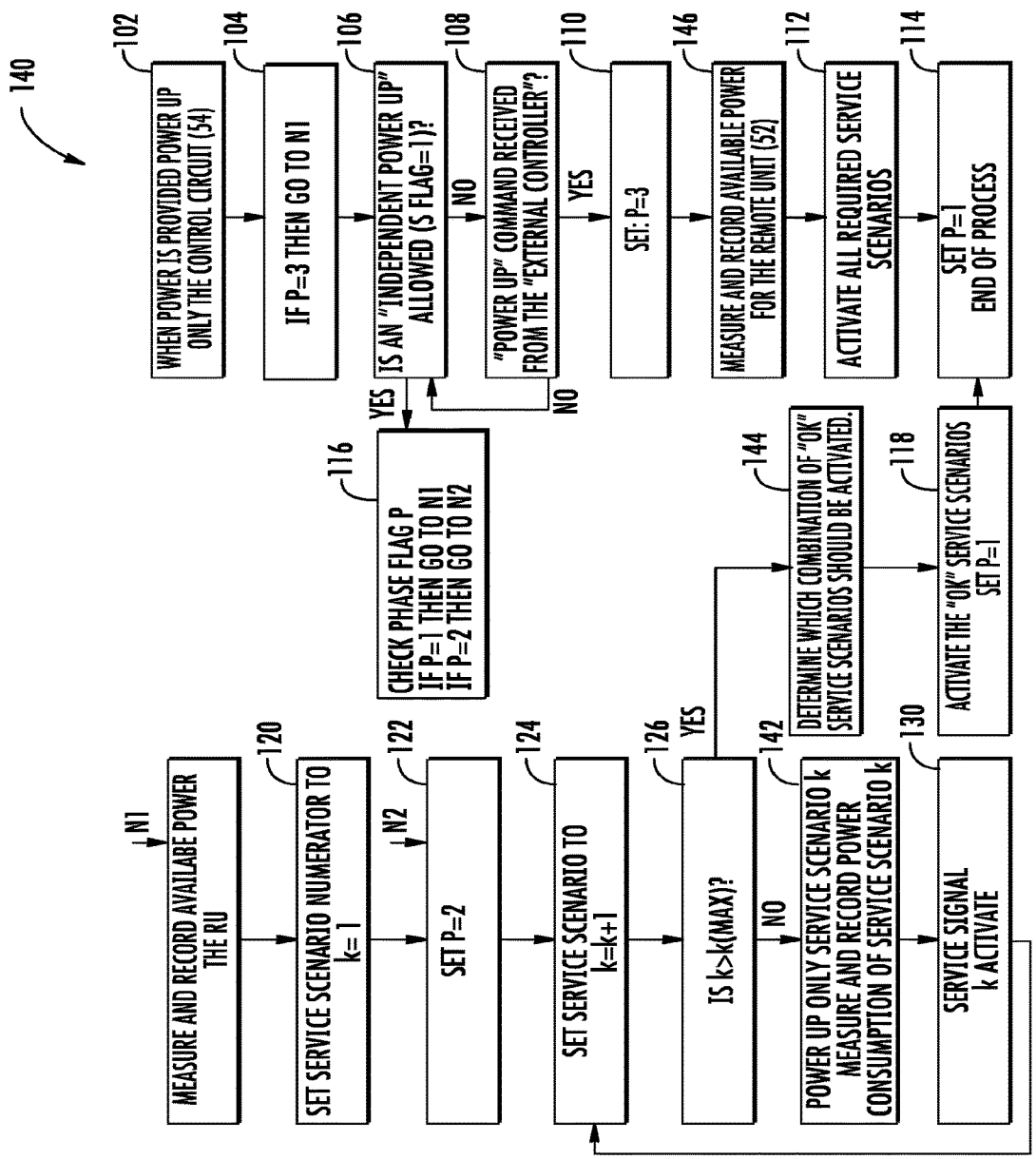
FIG. 6 is a flowchart illustrating an exemplary alternative process of the remote unit in FIG. 3 selectively activating communications services based on measuring actual power consumption of the remote as communications services are activated during a power-up process and not activating additional communications services that would cause the remote unit to draw more power than allowed.

FIG. 6 is a flowchart illustrating another exemplary power-up process 140 of the remote unit in FIG. 3 selectively activating communications services. In this power-up process 140, as will be discussed below, the control circuit 54 selectively activates the communications service circuits 56(1)-56(J) based on measuring actual power consumption of the remote unit 52 as communications services are activated. In this regard, the common processes between the power-up process 100 in FIG. 5 and the power-up process 140 in FIG. 6 are shown with common element numbers, and thus will not be re-described. As shown in FIG. 6, after the control circuit 54 determines if the determined k communications service circuits 56(1)-56(J) to be powered up is greater than the maximum communications service scenarios in block 126, the control circuit 54 only powers up the k communications service circuits 56(1)-56(J) based on the measured power consumption of the remote unit 52 (block 142) to avoid drawing more power than is allowed. If the determined k communications service circuits 56(1)-56(J) to be powered up is greater than the maximum communications service scenarios in block 126, the control circuit 54 determines which combinations of communications service circuits 56(1)-56(J) should be powered up since not all communications service circuits 56(1)-56(J) can be powered without drawing more power than is allowed (block 144). Further, if the control circuit 54 determines if a status flag is set to S=1 to indicate that the power-up process was initiated independently by the remote unit 52 (block 106), and the power-up command was received from an external controller (block 108), after the phase flag is set to P=3 in block 110, the control circuit 54 measures and records the available power for the remote unit 52 in block 146.

Figure 1:
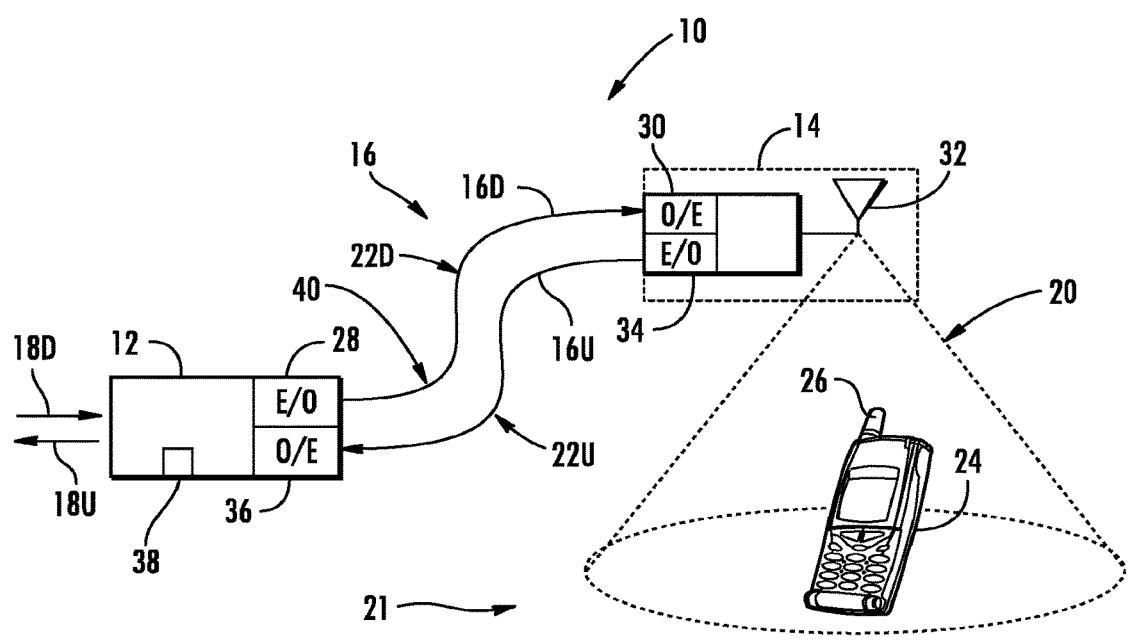
FIG. 1 is a schematic diagram of an exemplary optical fiber-based distributed antenna system (DAS)
Figure 7:
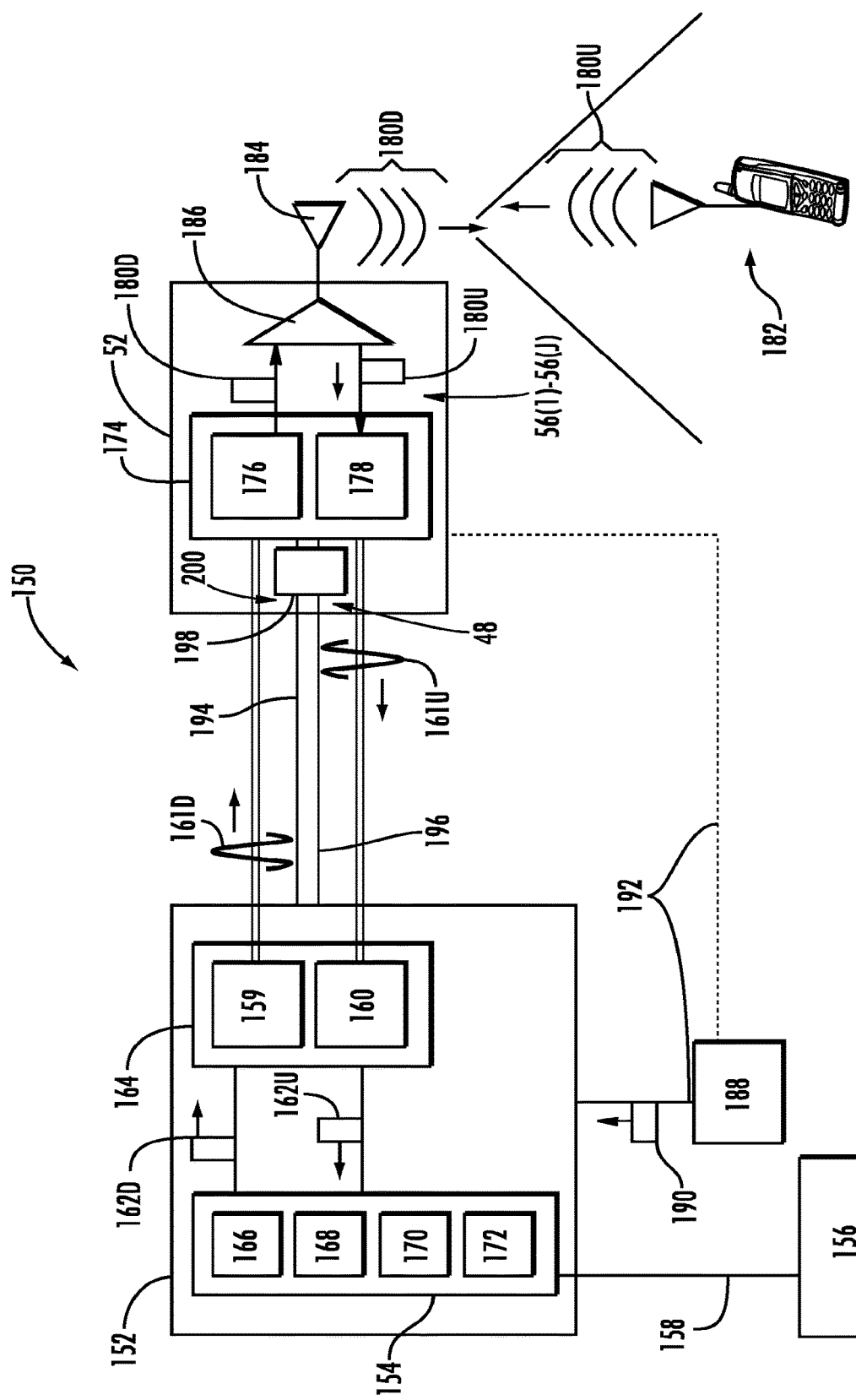
FIG. 7 is a more detailed schematic diagram of exemplary head-end equipment and a remote unit that can be deployed in the DAS, wherein the remote unit is configured to selectively activate communications services on power-up based on power consumption of the remote unit.

FIG. 7 is a more detailed schematic diagram of another exemplary DAS 150 of FIG. 1 that can include the remote unit 52 in FIG. 3 that receives power from a HEE 152 and can selectively activate communications service circuits. In this example, the DAS 150 is an optical fiber-based DAS. In this regard, the HEE 152 includes a service unit 154 that provides electrical RF service signals by passing such signals from one or more outside networks 156 via a network link 158. In one embodiment, this includes providing cellular signal distribution in the frequency range from 400 MegaHertz (MHz) to 2.7 GigaHertz (GHz). In another embodiment, the service unit 154 provides electrical RF service signals by generating the signals directly.

The service unit 154 is electrically coupled to the E/O converter 159 that receives the downlink electrical RF signals 162D from the service unit 154 and converts them to corresponding downlink optical RF signals 161D. The E/O converter 159 includes a laser suitable for delivering sufficient dynamic range for the RoF applications described herein, and optionally includes a laser driver/amplifier electrically coupled to the laser. The HEE 152 also includes the O/E converter 160, which is electrically coupled to the service unit 154. The O/E converter 160 receives uplink optical RF signals 161U and converts them to corresponding uplink electrical RF signals 162U. The E/O converter 159 and the O/E converter 160 constitute a "converter pair" 164, as illustrated in FIG. 7.

The service unit 154 in the HEE 152 can include an RF signal conditioner unit 166 for conditioning the downlink electrical RF signals 162D and the uplink electrical RF signals 162U, respectively. The service unit 154 can include a digital signal processing unit 168 for providing to the RF signal conditioner unit 166 an electrical signal that is modulated onto an RF carrier to generate a desired downlink electrical RF signal 162D. The digital signal processing unit 168 is also configured to process a demodulation signal provided by the demodulation of the uplink electrical RF signal 162U by the RF signal conditioner unit 166. The HEE 152 can also include an optional central processing unit (CPU) 170 for processing data and otherwise performing logic and computing operations, and a memory unit 172 for storing data, such as data to be transmitted over a WLAN or other network for example.

The remote unit 52 also includes a converter pair 174 comprising the O/E converter 176 and the E/O converter 178. The O/E converter 176 converts the received downlink optical RF signals 161D from the HEE 152 back into downlink electrical RF signals 180D. The E/O converter 178 converts uplink electrical RF signals 180U received from a client device 182 into the uplink optical RF signals 161U to be communicated to the HEE 152. The O/E converter 176 and the E/O converter 178 are electrically coupled to an antenna 184 via an RF signal-directing element 186. The RF signal-directing element 186 serves to direct the downlink electrical RF signals 180D and the uplink electrical RF signals 180U, as discussed below.

The DAS 150 in FIG. 7 also includes a power unit 188 that includes a power supply and provides an electrical power signal 190. The power unit 188 is electrically coupled to the HEE 152 for powering the power-consuming elements therein. In one embodiment, an electrical power line 192 runs through the HEE 152 and over to the remote unit 52 to power the O/E converter 176 and the E/O converter 178 in the converter pair 174, the optional RF signal-directing element 186 (unless the RF signal-directing element 186 is a passive device such as a circulator for example), and any other power-consuming elements provided. These other power-consuming elements can include the communications service circuits 56(1)-56(J). The electrical power line 192 includes two wires 194 and 196 that carry a voltage, and are electrically coupled to a DC power converter 198 at the remote unit 52. The DC power converter 198 is electrically coupled to the O/E converter 176 and the E/O converter 178 in the converter pair 174, and changes the voltage or levels of the electrical power signal 200 providing power 48 to the power level(s) required by the power-consuming components in the remote unit 52. The DC power converter 198 can be either a DC/DC power converter or an AC/DC power converter, depending on the type of electrical power signal 200 carried by the electrical power line 192. In another example embodiment, the electrical power line 192 (dashed line) runs directly from the power unit 188 to the remote unit 52 rather than from or through the HEE 152.

Figure 8:
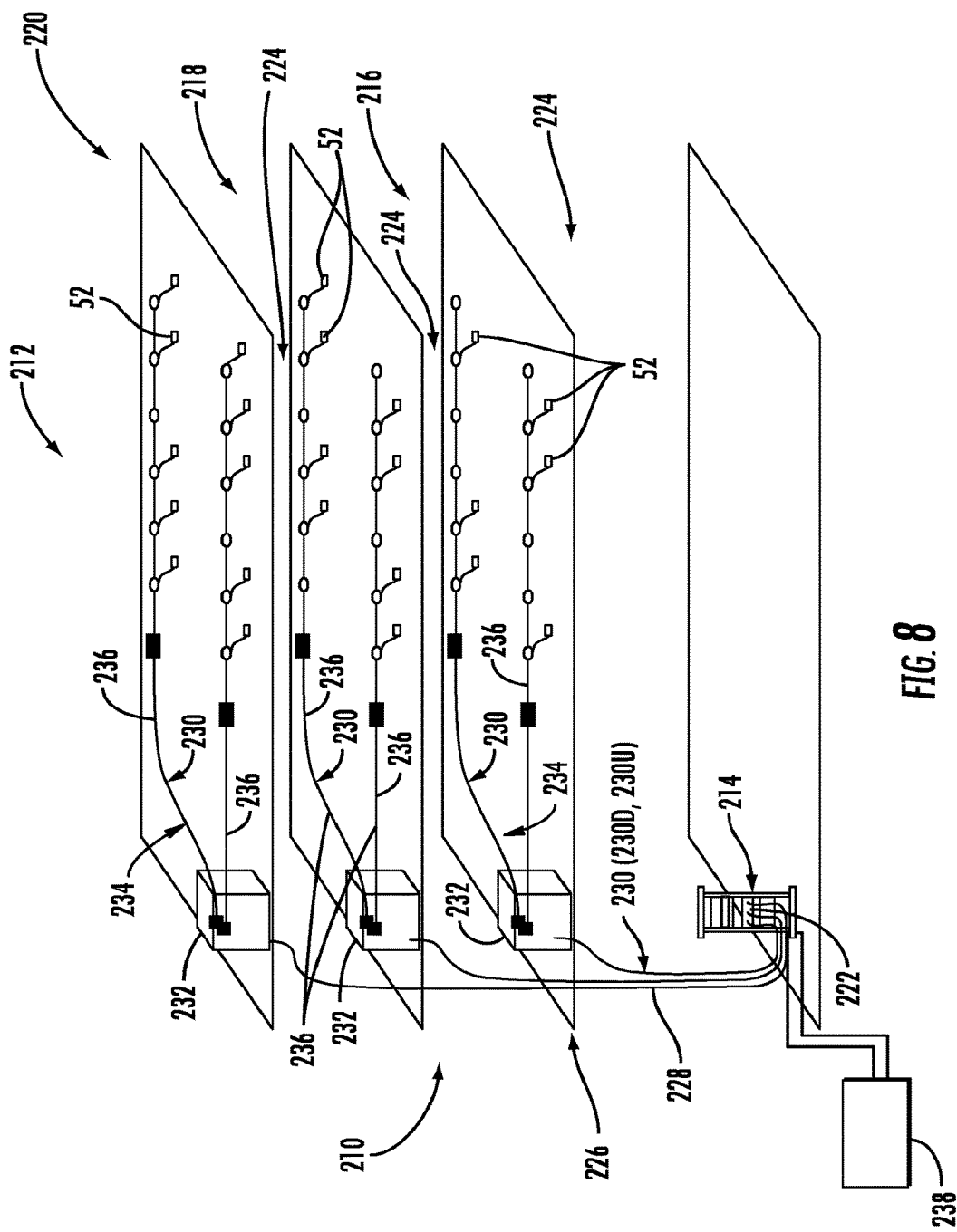
FIG. 8 is a partially schematic cut-away diagram of an exemplary building infrastructure in which the DAS employing remote units configured to selectively activate communications services on power-up based on power consumption of the remote unit can be employed.

To provide further illustration of how a DAS can be deployed indoors, FIG. 8 illustrates a partially schematic cut-away diagram of a building infrastructure 210 employing a DAS 212 that can include remote units 52 configured to selectively activate communications service circuits, including according to any of the embodiments disclosed herein. The building infrastructure 210 generally represents any type of building in which the DAS 212 can be deployed. The DAS 212 incorporates a HEE 214 to provide various types of communications services to coverage areas within the building infrastructure 210.

The building infrastructure 210 includes a first (ground) floor 216, a second floor 218, and a third floor 220. The floors 216, 218, 220 are serviced by the HEE 214 through a main distribution frame 222 to provide antenna coverage areas 224 in the building infrastructure 210. Only the ceilings of the floors 216, 218, 220 are shown in FIG. 8 for simplicity of illustration. In the example embodiment, a main cable 226 has a number of different sections that facilitate the placement of a large number of remote units 52 in the building infrastructure 210. Each remote unit 52 in turn services its own coverage area in the antenna coverage areas 224. The main cable 226 can include a riser cable 228 that carries all of downlink and uplink optical fibers 230D, 230U to and from the HEE 214.

The riser cable 228 may be routed through a power unit 232. The power unit 232 may also be configured to provide power to the remote units 52 via the electrical power line 234, as illustrated in FIG. 8 and discussed above, provided inside an array cable 236, or tail cable or home-run tether cable as other examples, and distributed with the downlink and uplink optical fibers 230D, 230U to the remote units 52. For example, as illustrated in the building infrastructure 210 in FIG. 8, the array cables 236 may extend from the power units 232. Downlink and uplink optical fibers in the array cables 236 are routed to each of the remote units 52, as illustrated in FIG. 8. The main cable 226 can include one or more multi-cable (MC) connectors adapted to connect select downlink and uplink optical fibers 230D, 230U, along with an electrical power line 234, to a number of optical fiber cables.

The main cable 226 enables multiple optical fiber cables to be distributed throughout the building infrastructure 210 (e.g., fixed to the ceilings or other support surfaces of each floor 216, 218, 220) to provide the antenna coverage areas 224 for the first, second, and third floors 216, 218, and 220. The HEE 214 may be located within the building infrastructure 210 (e.g., in a closet or control room), or located outside of the building infrastructure 210 at a remote location. A base transceiver station (BTS) 238, which may be provided by a second party such as a cellular service provider, is connected to the HEE 214, and can be co-located or located remotely from the HEE 214. A BTS is any station or signal source that provides an input signal to the HEE 214 and can receive a return signal from the HEE 214. In a typical cellular system, for example, a plurality of BTSs is deployed at a plurality of remote locations to provide wireless telephone coverage. Each BTS serves a corresponding cell and when a mobile client device enters the cell, the BTS communicates with the mobile client device. With reference to FIG. 8, the remote units 52 installed on a given floor 216, 218, or 220 may be serviced from the same optical fiber 230. In this regard, the optical fiber 230 may have multiple nodes where distinct downlink and uplink optical fiber pairs can be connected to a given remote unit 52.

Figure 9:
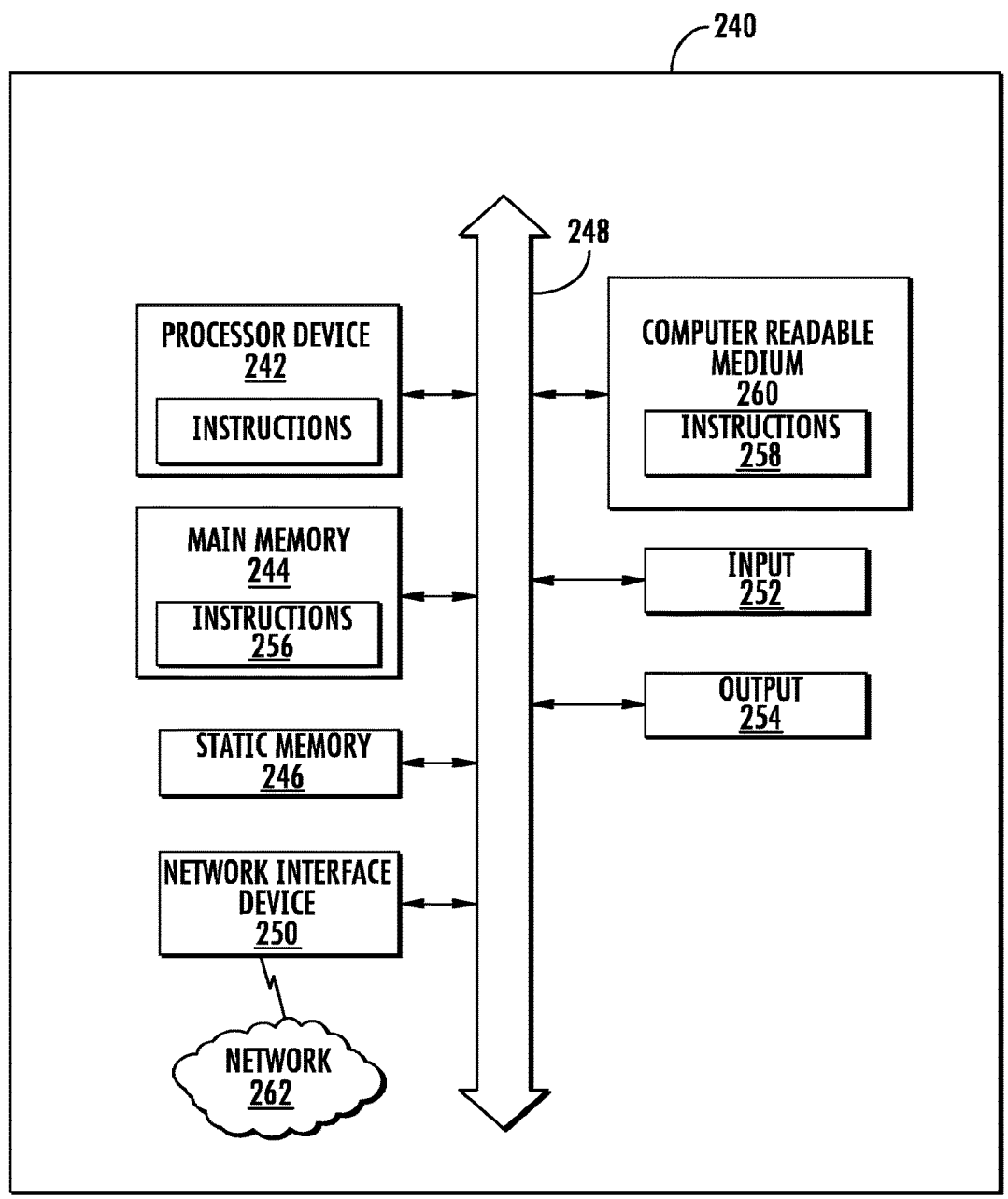
FIG. 9 is a schematic diagram of a generalized representation of an exemplary control circuit in the form of a controller that can be included in a DAS to control a remote unit(s) selectively activating communications services on power-up based on power consumption of the remote unit, wherein the exemplary computer system is adapted to execute instructions from an exemplary computer readable medium.

FIG. 9 is a schematic diagram representation of additional detail illustrating a computer system 240 that could be employed in the control circuits 54 of the remote units 52 for selectively activating communications service circuits 56(1)-56(J) to avoid the remote unit 52 drawing more power than is allowed. In this regard, the computer system 240 is adapted to execute instructions from an exemplary computer-readable medium to perform these and/or any of the functions or processing described herein.

In this regard, the computer system 240 in FIG. 9 may include a set of instructions that may be executed to selectively activate communications service circuits 56(1)-56(J) to avoid the remote unit 52 drawing more power than is allowed. The computer system 240 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 240 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 240 in this embodiment includes a processing device or processor 242, a main memory 244 (e.g., read-only memory (ROM), flash memory, dynamic random access memory (DRAM), such as synchronous DRAM (SDRAM), etc.), and a static memory 246 (e.g., flash memory, static random access memory (SRAM), etc.), which may communicate with each other via a data bus 248. The main memory 244 may include instructions that can be executed by the processor 242. Alternatively, the processor 242 may be connected to the main memory 244 and/or static memory 246 directly or via some other connectivity means. The processor 242 may be a controller, and the main memory 244 or static memory 246 may be any type of memory. The static memory 246 can be the NVM 82 previously described with regard to FIG. 3.

The processor 242 represents one or more general-purpose processing devices, such as a microprocessor, central processing unit, or the like. More particularly, the processor 242 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 242 is configured to execute processing logic in instructions for performing the operations and steps discussed herein.

The computer system 240 may further include a network interface device 250. The computer system 240 also may or may not include an input 252, configured to receive input and selections to be communicated to the computer system 240 when executing instructions. The computer system 240 also may or may not include an output 254, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 240 may or may not include a data storage device that includes instructions 258 stored in a computer-readable medium 260. The instructions 258 may also reside, completely or at least partially, within the main memory 244 and/or within the processor 242 during execution thereof by the computer system 240, the main memory 244 and the processor 242 also constituting computer-readable medium. The instructions 258 may further be transmitted or received over a network 262 via the network interface device 250. The instructions 258 may include instructions that can be executed by the control circuit 54 in the remote unit 52 of FIG. 3 to selectively activate communications service circuits 56(1)-56(J) to avoid the remote unit 52 drawing more power than is allowed.

While the computer-readable medium 260 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

As used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The distributed antenna systems herein can include any type or number of communications mediums, including but not limited to electrical conductors, optical fiber, and air (i.e., wireless transmission).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit for a wireless communication system (WCS), comprising:
    a plurality of communications service circuits each configured to process received respective communications signals for a respective communications service in the WCS;
    at least one optical/electrical (O/E) converter configured to receive at least one downlink optical communications signal from head-end equipment and convert the at least one downlink optical communications signal into at least one downlink electrical communications signal to be communicated to at least one client device;
    at least one electrical/optical (E/O) converter configured to receive at least one uplink electrical communications signal from at least one client device and convert the at least one uplink electrical communications signal to at least one uplink optical communications signal to be communicated to the head-end equipment;
    a power selection circuit configured to draw power over a power input from a power supply and selectively provide the drawn power to each of the plurality of communications service circuits based on a control signal; and
    a control circuit configured to:
        determine power consumption of the remote unit based on the drawn power over the power input from the power supply;
        determine if the power consumption of the remote unit exceeds a defined threshold power level for the remote unit;
        generate the control signal to direct the power selection circuit to selectively provide the drawn power to one or more of the plurality of communications service circuits in a sequence to activate the one or more of the plurality of communications service circuits, such that the power consumption of the remote unit does not exceed the defined threshold power level;
        store a communications service indicia comprised of phase indicia indicating the one or more of the plurality of communications service circuits drawing power from the power selection circuit such that the power consumption of the remote unit does not exceed the defined threshold power level;
        determine the power consumption of the remote unit based on the communications service indicia;
        set the phase indicia to an initial phase before generating the control signal to direct the power selection circuit to selectively provide the drawn power to the one or more of the plurality of communications service circuits;
        if the phase indicia is set, generate the control signal to direct the power selection circuit to selectively provide the drawn power to the one or more of the plurality of communications service circuits such that the power consumption of the remote unit does not exceed the defined threshold power level; and
        set the phase indicia based on each of the one or more of the plurality of communications service circuits drawing power from the power selection circuit.

2. The remote unit of claim 1, wherein the defined threshold power level is based on a maximum power draw level from the power supply.

3. The remote unit of claim 1, wherein the control circuit is configured to generate the control signal to direct the power selection circuit to not provide the drawn power to an additional communications service circuit among the plurality of communications service circuits if the power consumption exceeds the defined threshold power level.

4. The remote unit of claim 3, wherein the control circuit is configured to repeatedly:
    determine the power consumption of the remote unit based on at least one communications service circuit among the plurality of communications service circuits drawing power from the power selection circuit;
    determine if the power consumption of the remote unit exceeds the defined threshold power level for the remote unit; and
    generate the control signal to direct the power selection circuit to selectively provide the drawn power to a next communications service circuit among the plurality of communications service circuits, if the power consumption does not exceed the defined threshold power level.

5. The remote unit of claim 4, wherein the control circuit is configured to generate the control signal to direct the power selection circuit to selectively provide the drawn power to the next communications service circuit based on a priority communications service power-up list for the plurality of communications service circuits.

6. The remote unit of claim 1, wherein the control circuit is configured to generate the control signal to direct the power selection circuit to selectively provide the drawn power to the one or more of the plurality of communications service circuits during a power-up process of the remote unit.

7. The remote unit of claim 6, wherein the power supply is comprised of an internal power supply, and wherein the power selection circuit is configured to draw the power over the power input from the internal power supply.

8. The remote unit of claim 1, further comprising a non-volatile memory, wherein the control circuit is configured to store the communications service indicia in the non-volatile memory.

9. The remote unit of claim 1, wherein the control circuit is configured to generate the control signal to direct the power selection circuit to selectively provide the drawn power to the one or more of the plurality of communications service circuits during a subsequent power-up process of the remote unit, based on the communications service indicia indicating the one or more of the plurality of communications service circuits drawing power during a previous power-up process of the remote unit.

10. The remote unit of claim 1, wherein the control circuit is configured to reset the phase indicia to the initial phase if the power selection circuit selectively providing the drawn power to all communications service circuits among the plurality of communications service circuits did not cause the power consumption of the remote unit to exceed the defined threshold power level.

11. The remote unit of claim 10, wherein the control circuit is configured to generate the control signal to direct the power selection circuit to selectively provide the drawn power to the one or more of the plurality of communications service circuits such that the power consumption of the remote unit does not exceed the defined threshold power level based on the phase indicia.

12. The remote unit of claim 1, further comprising a power measurement circuit configured to measure the power consumed by the remote unit and generate a power measurement signal indicating a power consumption level indicating the power consumption by the remote unit, wherein the control circuit is configured to:
 receive the power measurement signal; and
 generate the control signal to direct the power selection circuit to selectively provide the drawn power to the one or more of the plurality of communications service circuits such that the power consumption of the remote unit does not exceed the defined threshold power level based on the power consumption level.

13. The remote unit of claim 12, further comprising a non-volatile memory, wherein the control circuit is configured to store the communications service indicia in the non-volatile memory.

14. The remote unit of claim 12, wherein the control circuit is configured to generate the control signal to direct the power selection circuit to selectively provide the drawn power to the one or more of the plurality of communications service circuits during a subsequent power-up process of the remote unit, based on the communications service indicia indicating the one or more of the plurality of communications service circuits drawing power during a previous power-up process of the remote unit.

15. The remote unit of claim 14, wherein the control circuit is configured to, if the phase indicia is not set, generate the control signal to direct the power selection circuit to selectively provide the drawn power to each of the plurality of communications service circuits.

16. The remote unit of claim 15, wherein the power selection circuit is configured to draw the power over the power input from an external power supply.

17. The remote unit of claim 12, wherein the control circuit is configured to reset the phase indicia to the initial phase if the power selection circuit selectively providing the drawn power to all communications service circuits among the plurality of communications service circuits did not cause the power consumption of the remote unit to exceed the defined threshold power level.

18. The remote unit of claim 1, wherein the power selection circuit is comprised of a plurality of switches each configured to direct the drawn power to a respective communications service circuit among the plurality of communications service circuits based on the control signal.

19. The remote unit of claim 18, wherein the power selection circuit is configured to draw the power over the power input from at least one electrical conductor.

20. The remote unit of claim 19, where at least one of the plurality of communications service circuits comprises an Ethernet connectivity service.

21. A method of controlling power consumption of a remote unit in a wireless communication system (WCS), comprising:
 drawing power from a power supply in response to a power-up condition;
 receiving at least one downlink optical communications signal from head-end equipment;
 converting, at an optical/electrical (O/E) converter in the remote unit, the at least one downlink optical communications signal into at least one downlink electrical communications signal to be communicated to at least one client device;
 determining the power consumption of the remote unit based on the drawn power from the power supply;
 determining if the power consumption of the remote unit exceeds a defined threshold power level for the remote unit;
 selectively providing the drawn power to one or more of a plurality of communications service circuits each configured to receive a respective communications signal for a respective communications service in the WCS in a sequence, to activate the one or more of the plurality of communications service circuits, based on the determined power consumption of the remote unit;
 storing a communications service indicia comprised of phase indicia indicating the one or more of the plurality of communications service circuits drawing power from the power selection circuit such that the power consumption of the remote unit does not exceed the defined threshold power level;
 determining the power consumption of the remote unit based on the communications service indicia;
 setting the phase indicia to an initial phase before generating a control signal to direct a power selection circuit to selectively provide the drawn power to the one or more of the plurality of communications service circuits;
 if the phase indicia is set, generating the control signal to direct the power selection circuit to selectively provide the drawn power to the one or more of the plurality of communications service circuits such that the power consumption of the remote unit does not exceed the defined threshold power level; and setting the phase indicia based on each of the one or more of the plurality of communications service circuits drawing power from the power selection circuit.

22. The method of claim 21, further comprising:

receiving at least one uplink electrical communications signal from at least one client device; and converting, at an electrical/optical (E/O) converter in the remote unit, the at least one uplink electrical communications signal to at least one uplink optical communications signal to be communicated to the head-end equipment.

* * * * *

UNITED STATES PATENT AND TRADEMARK OFFICE
CERTIFICATE OF CORRECTION

PATENT NO. : 10,455,497 B2
APPLICATION NO. : 16/225992
DATED : October 22, 2019
INVENTOR(S) : Ron Hagag et al.

Page 1 of 1

It is certified that error appears in the above-identified patent and that said Letters Patent is hereby corrected as shown below:

On the Title Page

On page 2, Column 1, item (56), U.S. Patent Documents, Line 56, delete "Gietema" and insert -- Gietema et al. --, therefor.

On page 5, Column 1, item (56), U.S. Patent Documents, Line 38, delete "Atlas" and insert -- Atias --, therefor.

On page 6, Column 2, item (56), Other Publications, Line 49, delete "the the" and insert -- the --, therefor.

In the Claims

In Column 20, Line 28, Claim 21, delete "(WC S)" and insert -- (WCS) --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*